United States Patent
de Cremoux

(10) Patent No.: US 10,404,173 B1
(45) Date of Patent: Sep. 3, 2019

(54) BUCK-BOOST SWITCHING CONVERTER

(71) Applicant: Dialog Semiconductor (UK) Limited, London (GB)

(72) Inventor: Guillaume de Cremoux, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/925,970

(22) Filed: Mar. 20, 2018

(51) Int. Cl.
*H02M 3/158* (2006.01)
*H02M 3/157* (2006.01)

(52) U.S. Cl.
CPC ......... *H02M 3/1582* (2013.01); *H02M 3/157* (2013.01)

(58) Field of Classification Search
CPC ....... H02M 3/156–158; H02M 3/1582; H02M 3/1584; H02M 3/1588; G05F 1/56; G05F 1/565; G05F 1/575; Y02B 70/1466
USPC ................................................. 363/265–285
See application file for complete search history.

(56) References Cited

U.S. PATENT DOCUMENTS

| | | | | |
|---|---|---|---|---|
| 7,952,900 B2 * | 5/2011 | Tomiyoshi | .......... | H02M 3/1582 363/132 |
| 8,018,212 B1 * | 9/2011 | Petricek | .............. | H02M 3/1582 323/259 |
| 8,664,872 B2 * | 3/2014 | Fukuda | .............. | H05B 41/2883 315/224 |
| 2008/0310046 A1 * | 12/2008 | Menegoli | ............... | G11B 21/02 360/75 |
| 2015/0069958 A1 * | 3/2015 | Yang | ..................... | H02J 7/0052 320/107 |
| 2016/0294277 A1 * | 10/2016 | Romeo | ............... | H02M 3/1582 |

* cited by examiner

*Primary Examiner* — Yemane Mehari
(74) *Attorney, Agent, or Firm* — Saile Ackerman LLC; Stephen B. Ackerman

(57) ABSTRACT

A buck-boost switching converter which receives an input voltage and provides an output voltage is presented. The converter contains a first set of switches having a first power switch and a first ground switch, a second set of switches having a second power switch and a second ground switch. A controller is arranged to send control signals to the first and second set of switches. The controller is arranged such that in a buck mode, the first set of switches operates to provide buck regulation while the second power switch is held in a closed state. In a boost mode, the second set of switches operates to provide boost regulation while the first power switch is held in a closed state, and the controller is arranged to selectively operate the buck-boost switching converter in the buck mode or the boost mode based on a length of a time period.

29 Claims, 18 Drawing Sheets

BUCK-BOOST SWITCHING CONVERTER

TECHNICAL FIELD

The present disclosure relates to an apparatus and methods for regulating an output of a four-switch non-inverting buck-boost switching converter.

BACKGROUND

Four-switch non-inverting buck-boost switching converters can switch between different modes of operation depending on the relation between an input voltage and an output voltage of the switching converter. FIG. 1 is a schematic of a four-switch non-inverting buck-boost switching converter 10. An input voltage VIN is received at an input terminal and an output voltage VOUT is provided at an output terminal. An inductor 12 has a first terminal coupled to a first set of switches 14 at a first node LXU and a second terminal coupled to a second set of switches 16 at a second node LXO. An error amplifier 18 is used to generate a control signal based on the output voltage VOUT and a reference voltage VREF. The control signal is provided to a controller 19, and the controller 19 provides the control signal to regulate the power switches 14, 16. The first set of power switches comprises a high side switch that couples the inductor 12 to the input voltage VIN when it is in a closed state, and the second set of power switches comprises a high side switch that couples the inductor 12 to the output voltage VOUT when it is in a closed state.

If the input voltage VIN is substantially greater than the output voltage VOUT then the switching converter can operate in a buck mode by only operating the first set of switches 14, which may be referred to as the buck mode power switches. In the buck mode, the high side switch of the second set of switches 16 is in the closed state and couples the inductor 12 to the output voltage VOUT. If the input voltage VIN is substantially less than the output voltage VOUT then the switching converter can operate in a boost mode by only operating the second set of switches 16, which may be referred to as the boost mode power switches. In the boost mode, the high side switch of the first set of power 14 switches is in the closed state and couples the inductor 12 to the input voltage VIN. If the input voltage VIN is approximately equal to the output voltage VOUT then the switching converter operates in a buck-boost mode, which may be referred to as a buck-boost window, where all power switches 14, 16 are used to regulate the output voltage VOUT.

There are several existing methods of controlling the four-switch non-inverting buck-boost switching converter and selecting the appropriate operation mode. FIG. 2 is a schematic of a first implementation of a four-switch non-inverting buck-boost switching converter 20. The output voltage VOUT and the reference voltage VREF are received at an error amplifier, and an error amplifier voltage VEA is provided to a first comparator 22 and a second comparator 24. The first comparator 22 receives a first voltage ramp and the second comparator 24 receives a second voltage ramp. An output of the first comparator 22 is provided to a reset terminal of a first SR latch 26. An output of the second comparator 24 is provided to a reset terminal of a second SR latch 28. The first SR latch 26 receives a first clock signal and the second SR latch 28 receives a second clock signal. The first SR latch 26 provides the control signal Mag-BOOST to operate the second set of switches 16 and the second SR latch 28 provides the control signal MagBUCK to operate the first set of switches 14.

The method of controlling the four-switching non-inverting buck boost switching converter 20 is typically referred to as "voltage mode". This is in reference to the comparison of voltages, namely the voltage ramps with the error amplifier voltage VEA.

FIG. 3 is a plot of showing the operation of the switching converter 20 where the input voltage VIN decreases from left to right. The decreasing input voltage VIN results in an increasing error amplifier voltage VEA. FIG. 3 shows a second clock signal 30, a first clock signal 31, a first voltage ramp 32, a second voltage ramp 33, an error amplifier voltage VEA 34, a control signal MagBUCK 35, a control signal MagBOOST 36, and a current 37 through the inductor 12.

For a small output voltage VOUT compared to the input voltage VIN, the error amplifier voltage VEA is small such that the error amplifier voltage VEA intercepts the second voltage ramp 33 such that the control signal MagBUCK 35 provides a suitable signal for regulation of the first set of switches thereby operating the switching converter 20 as a buck converter.

For a large output voltage VOUT compared to the input voltage VIN, the error amplifier voltage VEA is large such that the error amplifier voltage VEA intercepts the first voltage ramp 32 such that the control signal MagBOOST 36 provides a suitable signal for regulation of the second set of switches thereby operating the switching converter 20 as a boost converter.

For an output voltage VOUT approximately equal to the input voltage VIN, the error amplifier voltage VEA intercepts the first voltage ramp 32 and the second voltage ramp 33, such that the control signal MagBUCK 35 and the control signal MagBOOST 36 provide suitable signals for regulation of the first set of power switches and the second set of switches thereby operating the switching converter 20 as a buck-boost converter.

A schematic of a second implementation of a four-switch non-inverting buck-boost switching converter is shown in FIG. 4. The four-switch non-inverting buck-boost switching converter of FIG. 4 is a current mode buck-boost converter 40. Operation of the current mode buck-boost converter 40 comprises three phases: a first phase, relating to the boost mode operation and a charging current; a second phase, relating to the buck mode operation and a discharging current; and a bypass phase where a first high side switch 42 and a second high side switch 44 are closed. The buck-boost converter 40 comprises a current sensing function.

The current mode buck-boost converter 40 comprises a current sensing resistor 46, which has a resistance of 10 mΩ. The current sensing resistor 46 converts current flowing through an inductor 48 into a sensed voltage. The sensed voltage is received by a first comparator 41 and a second comparator 43. The sensed voltage is compared with a first constraint −k·VEA by the first comparator 41 and the sensed voltage is compared with a second constraint +k·VEA by the second comparator 43. An output of the first comparator 41 is used to generate the control signal MagBUCK and an output of the second comparator 43 is used to generate the control signal MagBOOST. The method of controlling the current mode buck boost switching converter 40 is typically referred to as "current mode".

The switching converters shown in FIGS. 1, 2 and 4 require a constant clock. Additionally, the switching converters shown in FIGS. 1, 2 and 4 rely on process and timing dependent comparators and voltage ramps, which can result in variation in the voltages at which the error amplifier voltage VEA overlaps with the voltage ramps 32, 33. This can change the input voltage VIN and output voltage VOUT values over which the switching converters operate in the buck-boost mode. Trimming steps or extra correcting loops are required to resolve this issue.

The switching converters of FIGS. 1, 2 and 4 also require the design of extra analog circuit blocks, including: oscillators, current sensors, comparators and compensation. Therefore, it is desirable to reduce complexity of the above switching converters.

SUMMARY

It is an object of the current disclosure to reduce the complexity of four-switch non-inverting buck-boost switching converters.

According to a first aspect of the disclosure there is provided a buck-boost switching converter with an input for receiving an input voltage and an output for providing an output voltage, comprising a first set of switches comprising a first power switch and a first ground switch, a second set of switches comprising a second power switch and a second ground switch, a controller arranged to send control signals to the first set of switches and the second set of switches and arranged such that in a buck mode, the first set of switches operates to provide buck regulation while the second power switch is held in a closed state, in a boost mode, the second set of switches operates to provide boost regulation while the first power switch is held in a closed state, and the controller is arranged to selectively operate the buck-boost switching converter in the buck mode or the boost mode based on a length of a time period throughout the course of which both of the first power switch and the second power switch are in a similar state.

Optionally, when operating in the buck mode, the controller is arranged to switch the buck-boost switching converter to the boost mode if the time period during which both of the first power switch and the second power switch are in a similar state exceeds a first threshold, and when operating in the boost mode, the controller is arranged to switch the buck-boost switching converter to the buck mode if the time period during which both of the first power switch and the second power switch are in a similar state exceeds a second threshold.

Optionally, the first and second thresholds are the same.

Optionally, the buck-boost switching converter comprises an energy storage element, the output is coupled with the energy storage element when the second power switch is in a closed state, and the input is coupled with the energy storage element when the first power switch is in a closed state.

Optionally, the similar state is a closed state.

Optionally, the energy storage element is an inductor.

Optionally, the buck-boost switching converter comprises an input of a first integration circuit coupled to a first terminal of the inductor, the first integration circuit arranged to receive a first voltage signal from the first terminal of the inductor, and to provide an integrated first voltage signal at an output of the first integration circuit, an input of a second integration circuit coupled to a second terminal of the inductor, the second integration circuit arranged to receive a second voltage signal from the second terminal of the inductor and to provide an integrated second voltage signal at an output of the second integration circuit, and a comparator with a first input coupled to the output of the first integration circuit and a second input coupled to the output of the second integration circuit, the comparator arranged to output the control signals at an output of the comparator and to provide the control signals to the controller.

Optionally, the buck-boost switching converter is a hysteretic buck-boost switching converter, wherein the comparator exhibits hysteresis.

Optionally, the buck-boost switching converter comprises a feedback voltage coupled to the first input of the comparator and a reference voltage coupled to the second input of the comparator.

Optionally, the controller comprises a demultiplexer, that is arranged to receive the control signals from the output of the comparator and to provide the control signals to the first set of switches in the buck mode and to provide the control signals to the second set of switches in the boost mode.

Optionally, the demultiplexer provides the control signals to the first set of switches when operating in a first demultiplexer state and provides the control signals to the second set of switches when operating in a second demultiplexer state, wherein the demultiplexer is arranged to selectively operate in the first demultiplexer state or the second demultiplexer state based on the length of the time period throughout the course of which both of the first power switch and the second power switch are in the similar state.

Optionally, the first integration circuit comprises a first resistor and a first capacitor and the second integration circuit comprises a second resistor and a second capacitor.

Optionally, the output of the first integration circuit is coupled to the first input of the comparator via a first transmission element and the output of the second integration circuit is coupled to the second input of the comparator via a second transmission element.

Optionally, the first and second transmission elements are capacitors.

Optionally, the controller comprises a decision circuit, wherein when operating in the buck mode, the decision circuit is arranged to provide a first mode signal to switch the buck-boost switching converter to the boost mode if the time period during which both of the first power switch and the second power switch are in a similar state exceeds the first threshold, and when operating in the boost mode, the decision circuit is arranged to provide a second mode signal to switch the buck-boost switching converter to the buck mode if the time period during which both of the first power switch and the second power switch are in a similar state exceeds the second threshold.

Optionally, the decision circuit comprises an AND gate comprising a first input coupled to the first power switch and a second input coupled to the second power switch, a timing circuit comprising an input coupled to an output of the AND gate, and a mode circuit comprising an input coupled to an output of the timing circuit; wherein the AND gate outputs a high signal when the first power switch and the second power switch are in the similar state, wherein when operating in the buck mode, if a high signal is received at the input of the timing circuit for the first threshold then the timing circuit outputs a signal to the mode circuit, and in response the mode circuit provides the first mode signal to switch the mode of operation of the switching converter from the buck mode to the boost mode, and when operating in the boost mode, if a high signal is received at the input of the timing circuit for the second threshold then the timing circuit outputs a signal to the mode circuit, and in response the mode circuit provides the second mode signal to switch the mode of operation of the switching converter from the boost mode to the buck mode.

According to a second aspect of the disclosure there is provided a method of controlling the operation of a buck-boost switching converter of the type comprising a first set of switches comprising a first power switch and a first ground switch, and a second set of switches comprising a second power switch and a second ground switch, the method comprising sending control signals to the first set of switches and the second set of switches, in a buck mode, operating the first set of switches to provide buck regulation whilst holding the second power switch in a closed state, in a boost mode, operating the second set of switches to provide boost regulation whilst holding the first power switch in a closed state, and selectively operating the switching converter in the buck mode or the boost mode based on a length of a time period throughout the course of which both of the first power switch and the second power switch are in a similar state.

Optionally, the method comprises when operating in the buck mode, switching the buck-boost switching converter to the boost mode if the time period during which both of the first power switch and the second power switch are in a similar state exceeds a first threshold, and when operating in the boost mode, switching buck-boost switching converter to the buck mode if the time period during which both of the first power switch and the second power switch are in a similar state exceeds a second threshold.

Optionally, the first and second thresholds are the same.

Optionally, the buck-boost switching converter comprises an energy storage element, wherein an output of the buck-boost switching converter is coupled with the energy storage element when the second power switch is in a closed state, and an input is coupled with the energy storage element when the first power switch is in a closed state.

Optionally, the similar state is a closed state.

Optionally, the energy storage element is an inductor.

Optionally, the method comprises integrating a first voltage signal from a first terminal of the inductor and providing an integrated first voltage signal to a first input of a comparator, integrating a second voltage signal from a second terminal of the inductor and providing an integrated second voltage to a second input of the comparator, and outputting the control signals from an output of the comparator.

Optionally, the comparator exhibits hysteresis.

Optionally, the method comprises providing a feedback voltage to the first input of the comparator and providing a reference voltage to the second input of the comparator.

According to a third aspect of the disclosure there is provided a buck-boost switching converter with an input for receiving an input voltage and an output for providing an output voltage, comprising a first set of switches comprising a first power switch and a first ground switch, a second set of switches comprising a second power switch and a second ground switch, a comparator, an energy storage element, the output is coupled with the energy storage element when the second power switch is in a closed state, and the input is coupled with the energy storage element when the first power switch is in a closed state, an input of a first integration circuit coupled to a first terminal of the energy storage element, the first integration circuit arranged to receive a first voltage signal from the first terminal of the energy storage element and to provide an integrated first voltage signal at an output of the first integration circuit, and an input of a second integration circuit coupled to a second terminal of the energy storage element, the second integration circuit arranged to receive a second voltage signal from the second terminal of the energy storage element and to provide an integrated second voltage signal at an output of the second integration circuit, wherein the comparator has a first input coupled to the output of the first integration circuit, a second input coupled to the output of the second integration circuit, the comparator is arranged to output the control signals at an output of the comparator and to provide control signals to the first set of switches and the second set of switches and arranged such that in a buck mode, the first set of switches operates to provide buck regulation while the second power switch is held in a closed state, and in a boost mode, the second set of switches operates to provide boost regulation while the first power switch is held in a closed state.

Optionally, the energy storage element is an inductor.

According to a fourth aspect of the disclosure there is provided a method of controlling the operation of a buck-boost switching converter of the type comprising a first set of switches comprising a first power switch and a first ground switch, and a second set of switches comprising a second power switch and a second ground switch, the method comprising integrating a first voltage signal from a first terminal of an energy storage element, wherein the input is coupled with the energy storage element when the first power switch is in a closed state, providing an integrated first voltage signal to a first input of a comparator, integrating a second voltage signal from a second terminal of the energy storage element, wherein the output is coupled with the energy storage element when the second power switch is in a closed state, providing an integrated second voltage signal to a second input of the comparator, and receiving control signals at the first set of switches and the second set of switches, from an output of the comparator, wherein in a buck mode, the first set of switches operates to provide buck regulation while the second power switch is held in a closed state, and in a boost mode, the second set of switches operates to provide boost regulation while the first power switch is held in a closed state.

Optionally, the energy storage element is an inductor.

BRIEF DESCRIPTION OF THE DRAWINGS

The invention is described in further detail below by way of example and with reference to the accompanying drawings, in which.

DESCRIPTION

Figure 1:
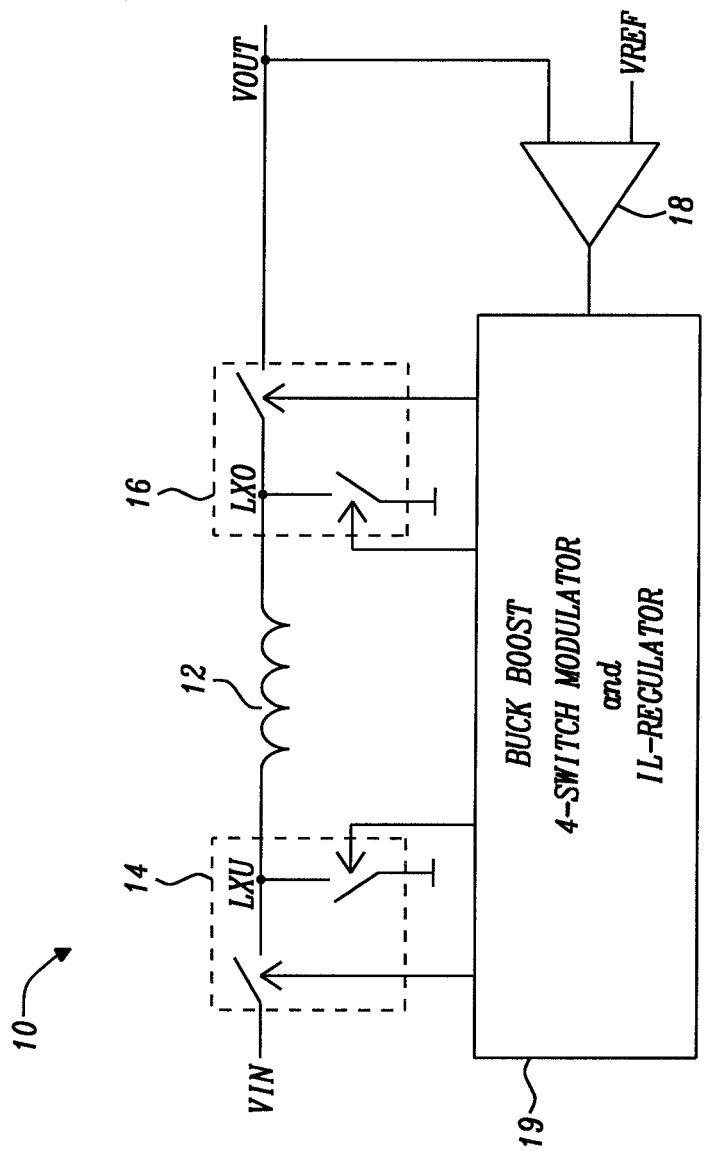
FIG. 1 is a schematic diagram of a four-switch non-inverting buck-boost converter according to the prior art.
Figure 2:
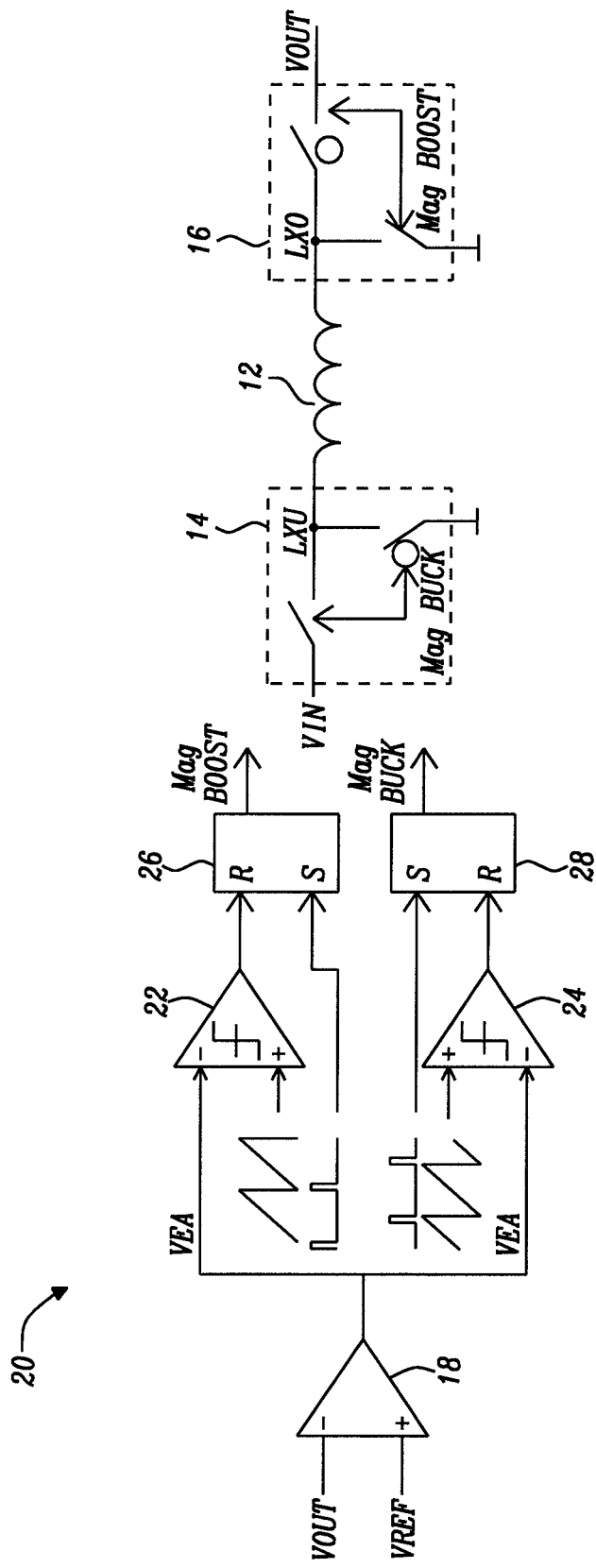
FIG. 2 is a schematic diagram of a first implementation of a four-switch non-inverting buck-boost switching converter according to the prior art.
Figure 3:
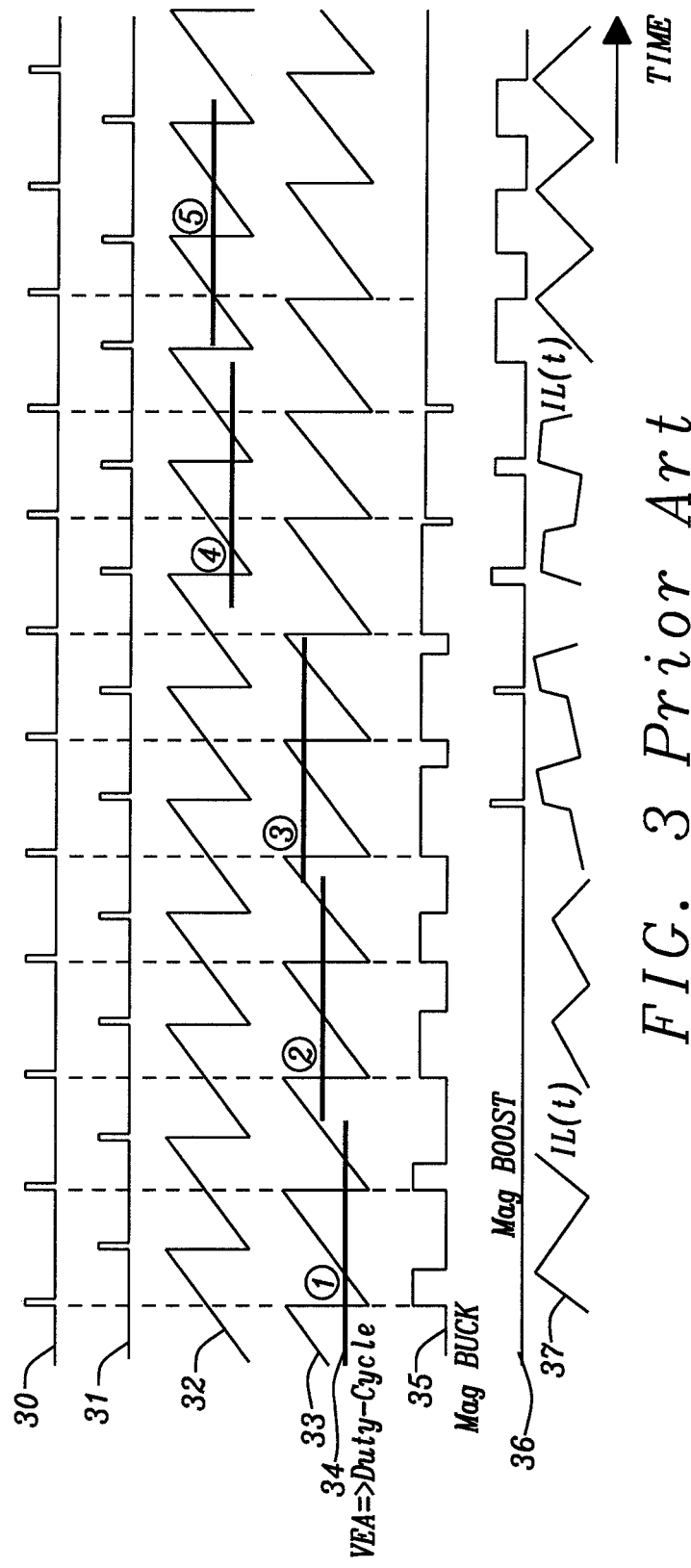
FIG. 3 is a graph showing the operation of the four-switch non-inverting buck-boost switching converter as shown in FIG. 2, and according to the prior art.
Figure 4:
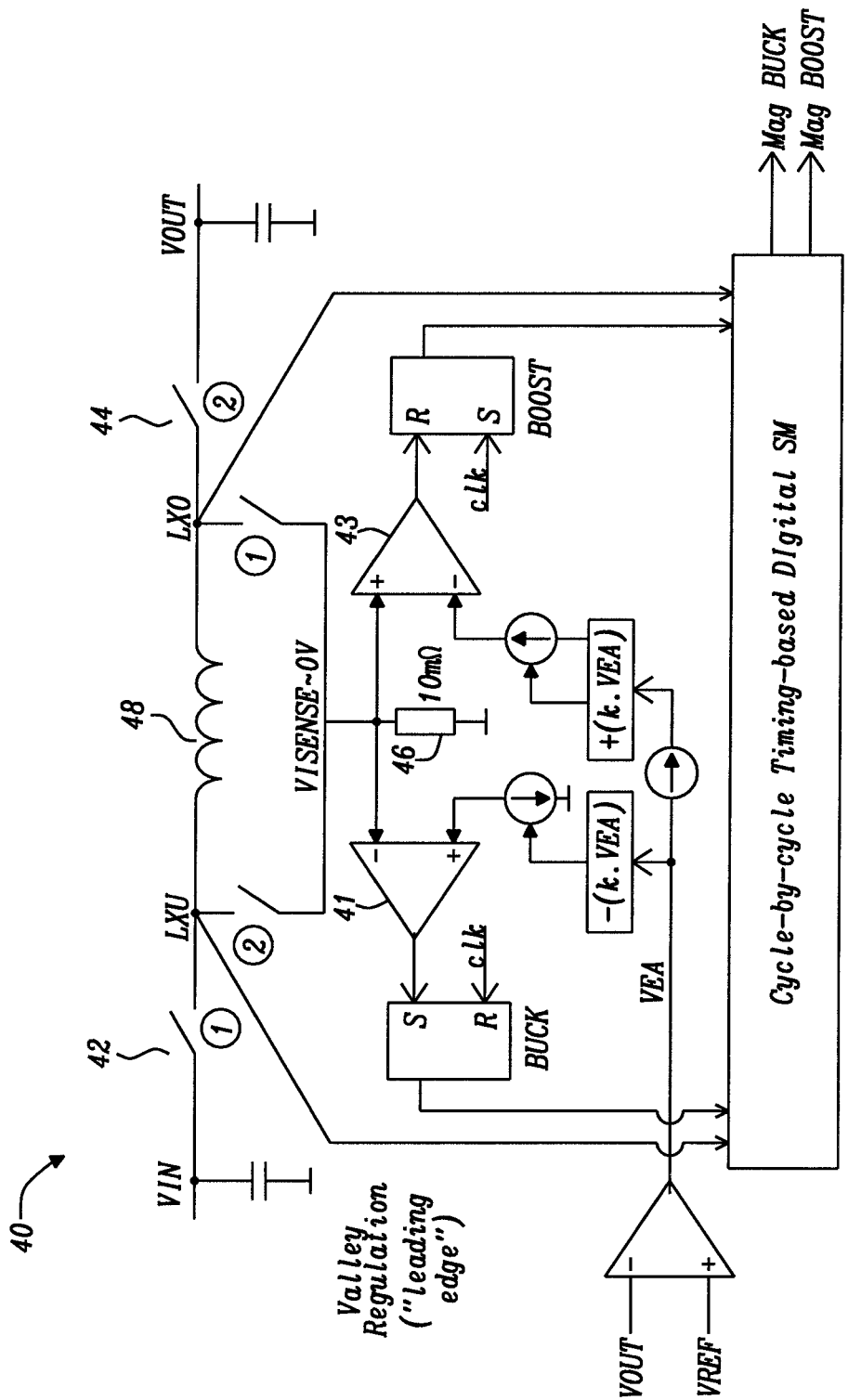
FIG. 4 is a schematic diagram of a second implementation of a four-switch non-inverting buck-boost converter according to the prior art.

In reducing complexity of a four-switch non-inverting buck-boost switching converters it is desirable to implement aspects of a current mode switching converter, such as the current mode switching converter 40 of FIG. 4, but to avoid implementation of a current sensing function.

Figure 5:
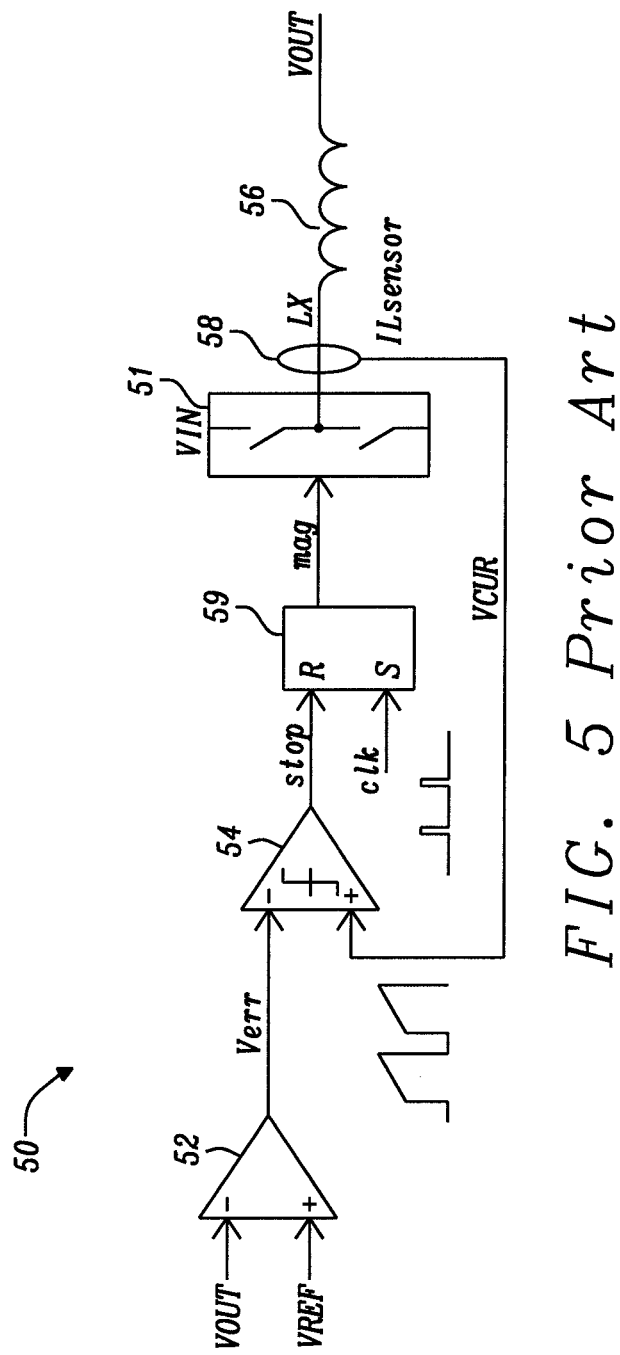
FIG. 5 is a schematic diagram of a peak current buck regulator according to the prior art.

FIG. 5 shows a schematic of a peak current buck regulator 50 in accordance with the prior art. An error amplifier 52 outputs an error voltage Verr to a comparator 54. The error voltage Verr is used to tune a peak value of an inductor current IL, where the inductor current IL is the current through an inductor 56. The inductor current IL is sensed using a current sensor 58 and provided to the comparator 54 as a current sensed voltage VCUR. The comparator 54 outputs a stop signal stop to a SR latch 59, which also receives a clock signal clk. The SR latch 59 outputs a control signal mag to regulate the set of switches 51.

Figure 6:
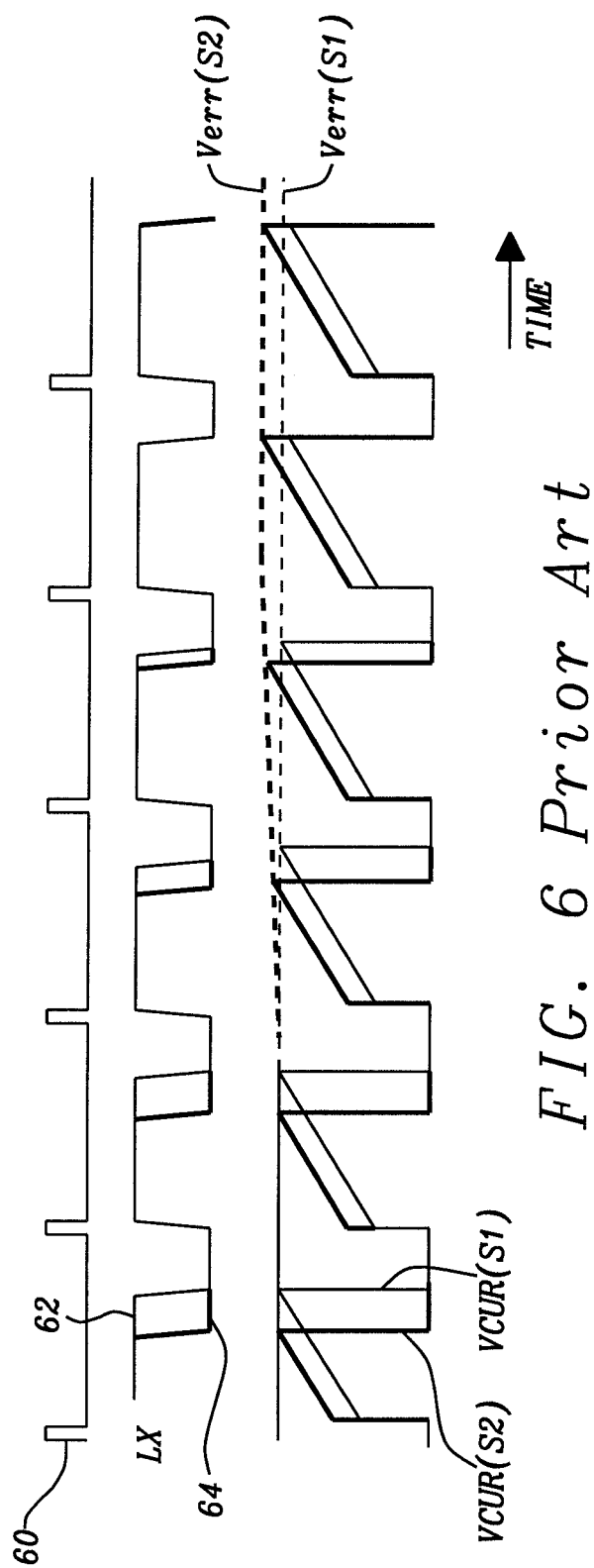
FIG. 6 is a graph showing the operation of two samples implementing the peak current buck regulator of FIG. 5 according to the prior art.

FIG. 6 is a graph showing the operation a first sample and a second sample, where both samples implement the same circuit, namely the peak current buck regulator 50 of FIG. 5. The second sample includes a mismatch when sensing the current sensed voltage VCUR compared to the first sample. There may be a mismatch between samples if, for example, each sample is implemented on a different die.

Shown on FIG. 6 is a clock signal 60, a voltage at a switching node LX at a first terminal of the inductor 56 for the first sample 62, a voltage at the switching node LX at a first terminal of the inductor 56 for the second sample 64, an error voltage Verr(S1) of the first sample, and error voltage Verr(S2) of the second sample, a current sensed voltage VCUR (S1) of the first sample and a current sensed voltage VCUR(S2) of the second sample.

Initially the mismatch in sensing the current sensed voltage VCUR results in a shorter duty cycle as shown by the voltage at the switching node LX for the second sample 64. However, eventually the regulation loop tunes the error voltage Verr(S2) and increases it until the duty cycle for both samples match. Therefore, a DC content of the current in the inductor 56 is not necessary for the peak current buck regulator 50.

Figure 7:
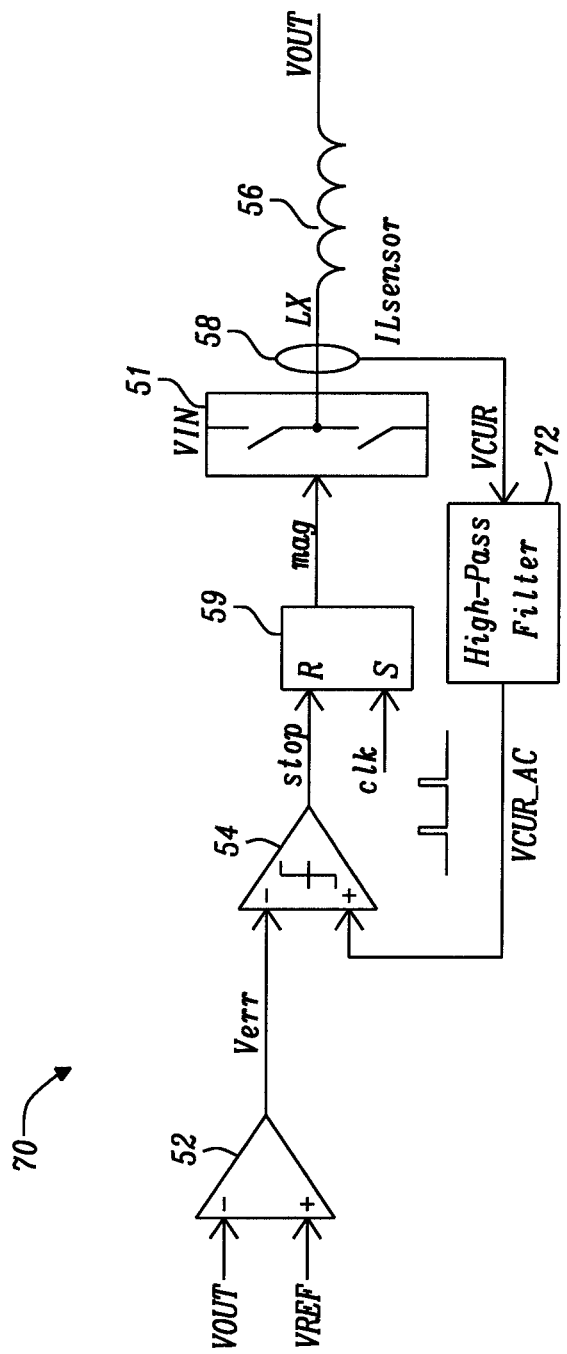
FIG. 7 is a schematic diagram of another peak current buck regulator according to the prior art.

FIG. 7 shows a peak current buck regulator 70 corresponding to the peak current buck regulator 50 of FIG. 5, but further comprising a high pass filter 72 to remove the DC content of the sensed current from the inductor 56.

The current sensed voltage VCUR of the peak current buck regulator 50 as shown in FIG. 5 may be represented by the following equation:

$$VCUR = RIV \cdot \int_0^t \frac{V(LX) - V(OUT)}{L} + DC_{constant}$$

where RIV is a conversion ratio between the inductor current IL and the current sensed voltage VCUR, t is a time, V(LX) is the voltage at the switching node LX, V(OUT) is the output voltage VOUT, L is the inductance of the inductor 56 and DC_constant is the DC content of the sensed current in the inductor 56, represented as a voltage.

Figure 8:
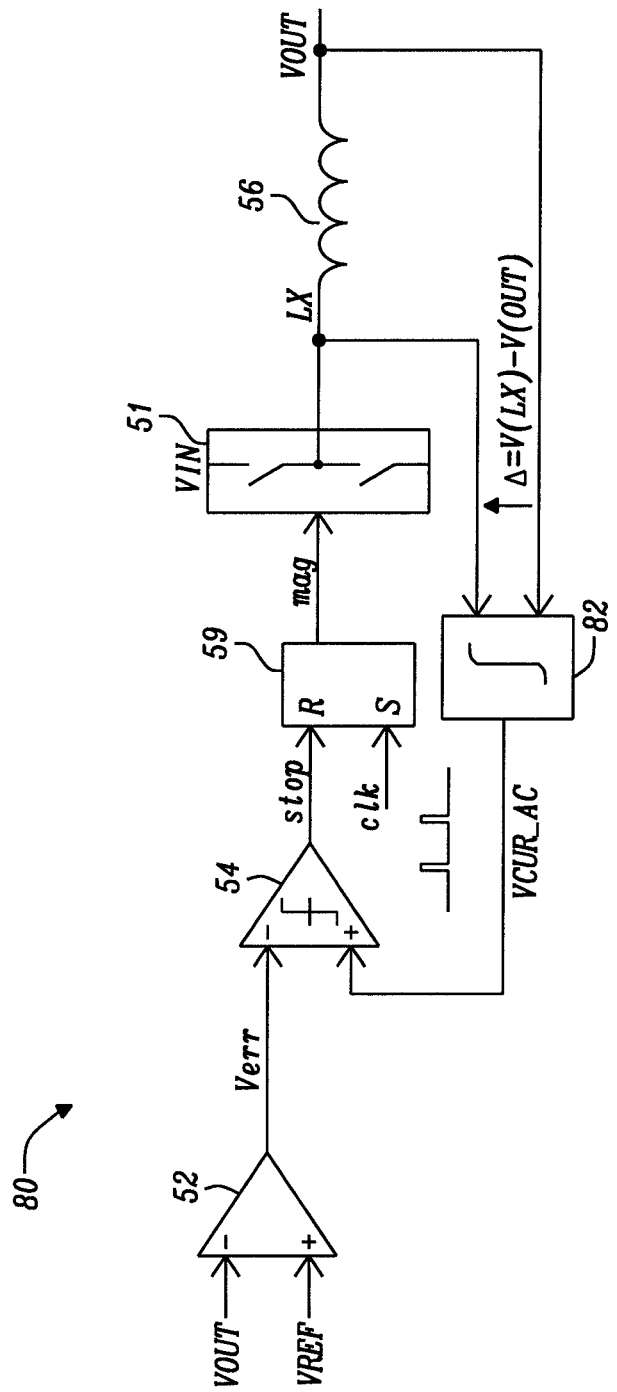
FIG. 8 is a schematic diagram of a buck regulator using a sensor-less method according to the prior art.

The alternating current (AC) characteristics of the inductor is the integrated voltage across the inductor 56. As shown by FIG. 6 it is possible to remove the DC component and therefore DC_constant from the above equation. Therefore, instead of using a current sensor method, it is possible to implement the AC content of the above equation directly as shown by the schematic in FIG. 8. FIG. 8 shows a buck regulator 80, corresponding the switching converter of FIG. 7, but using a sensor-less method. The buck regulator 80 comprises an integration circuit 82, which enables the integrated voltage across the inductor to be used to regulate the output voltage VOUT of the buck regulator 80.

The sensor-less method may be implemented in a buck converter, a boost converter, a hysteretic buck converter or a hysteretic boost converter.

Figure 9:
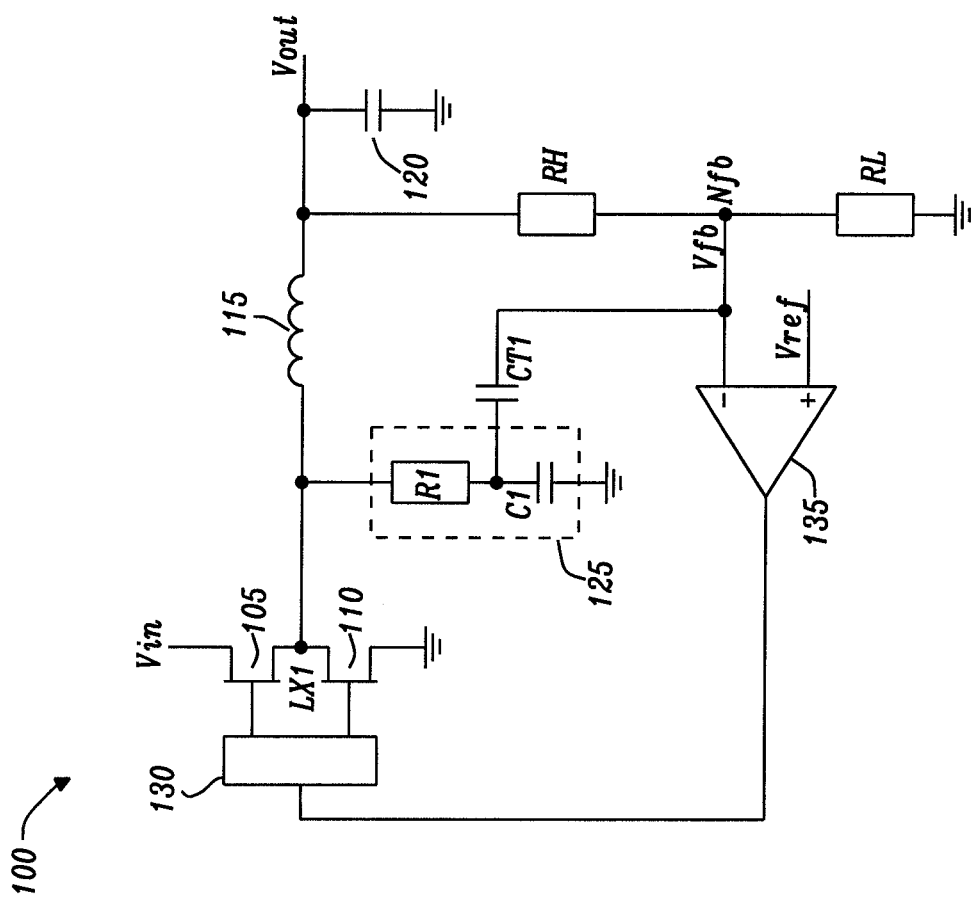
FIG. 9 is a schematic diagram of a hysteretic buck converter according to the prior art.

FIG. 9 shows a diagram of a hysteretic buck converter 100 that uses a sensor-less method to regulate an output voltage Vout according to the prior art. The buck converter 100 comprises a first set of switches comprising a first power switch 105, which may be referred to as a high side power switch and a first ground switch 110, which may be referred to as a low side power switch connected to a first terminal of an inductor 115 via a switching node LX1. A gate driver 130 has a first output coupled to the first power switch 105 and a second output coupled to the first ground switch 110. The first power switch 105 receives an input voltage Vin and the first ground switch 110 is coupled to ground. A second terminal of the inductor 115 is coupled to a first terminal of an output capacitor 120 that has a second terminal coupled to ground. The first terminal of the output capacitor 120 is at the output voltage Vout.

The second terminal of the inductor 115 is coupled to a first terminal of a first potential divider resistor RH. A second terminal of the first potential divider resistor RH is coupled to a first terminal of a second potential divider resistor RL at a feedback node Nfb that is at a feedback voltage Vfb. A second terminal of the second potential divider resistor RL is coupled to ground.

It is well known that conventional hysteretic buck converters may be unstable due to the output capacitor 120 being small and/or due to heavy loads. The output capacitor 120 comprises an equivalent series resistance (ESR) which adds a left half plane zero by stacking a first ESR voltage at the output, where the first ESR voltage is equal to a current through the inductor 115 multiplied by the ESR. A standard technique to compensate for the ESR of the capacitor 120 and to maintain stability is to mimic the ESR by adding, at the feedback node Nfb, a second ESR voltage comprising the same information as the as the ESR and the current through the inductor 115.

An integration circuit 125 comprises a first resistor R1 with a first terminal coupled to the switching node LX1 and a second terminal coupled to a first terminal of a first capacitor C1 that has a second terminal coupled to ground. A first terminal of a first transmission capacitor CT1 is coupled to a node between the first resistor R1 and the first capacitor C1.

The feedback node Nfb and a second terminal of the first transmission capacitor CT1 are coupled to a first input of a comparator 135. A second input of the comparator 135 receives a reference voltage Vref. An output of the comparator 135 is coupled to an input of the gate driver 130.

In operation, the gate driver 130 drives the switching operation of the first power switch 105 and the first ground switch 110 based on control signals generated by the comparator 135. The output of the comparator 135 is dependent on the comparison of the feedback voltage Vfb and the reference voltage Vref.

In operation, the integration circuit 125 integrates a voltage signal at the switching node LX1, which corresponds to the AC characteristics of the inductor. The feedback voltage Vfb comprises contributions from the output voltage Vout, and the integrated voltage signal from the switching node LX1.

The integrated voltage signal from the switching node LX1 is stacked on the feedback voltage Vfb using the transmission capacitor CT1. This enables a ripple to be stacked on the feedback voltage Vfb as though an ESR was present on the output capacitor 120. This ensures that the hysteretic buck converter 100 is stable.

By "stacked" it is meant that two voltages are added together. In the above example, the integrated voltage signal from the switching node LX1 is stacked on the feedback voltage Vfb. This means that the integrated voltage signal from the switching node LX1 is added to the feedback voltage Vfb that would be present if there was no coupling between the first transmission capacitor CT1 and the feedback node Nfb.

Figure 10:
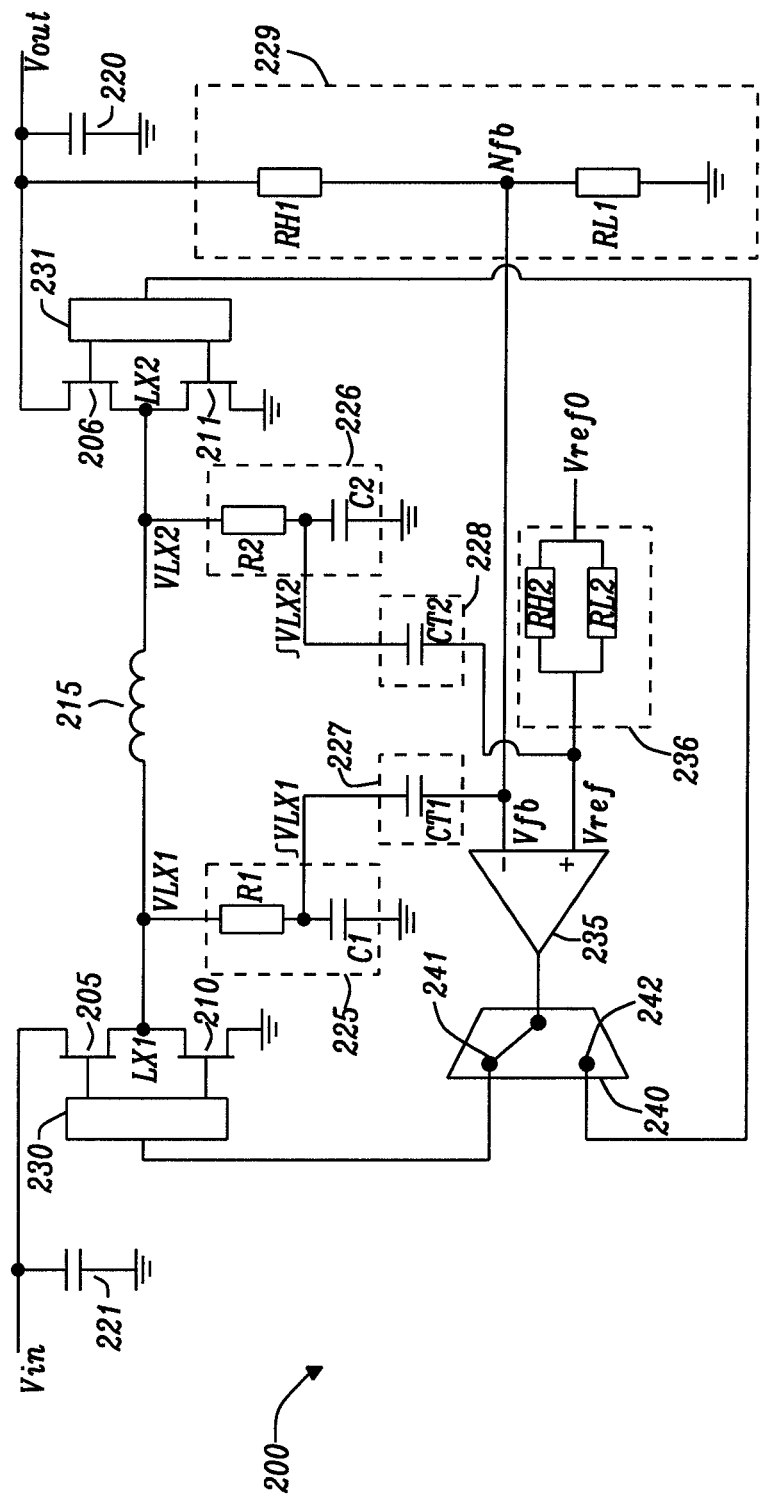
FIG. 10 is a schematic diagram of a buck-boost switching converter in accordance with a first embodiment of this disclosure.

FIG. 10 is a schematic of a first embodiment of a buck-boost switching converter 200 in accordance with the disclosure. The buck-boost switching converter 200 receives an input voltage Vin and uses a sensor-less method to provide a regulated output voltage Vout. The buck-boost switching converter 200 is arranged to operate in a buck mode or a boost mode.

The buck-boost switching converter 200 comprises an inductor 215, which is a type of energy storage element, with a first terminal coupled to a first set of switches and a second terminal coupled to a second set of switches.

In the present embodiment, the buck mode corresponds to operation of the buck-boost switching converter 200 as a buck converter, and the boost mode corresponds to operation of the buck-boost switching converter 200 as a boost converter. The buck-boost switching converter 200 operates in the buck mode, corresponding to operation as a buck converter, when the output voltage Vout is substantially less than the input voltage Vin; operates in the boost mode, corresponding to operation as a boost converter, when the output voltage Vout is substantially greater than the input voltage Vin; and alternates between operation as a buck converter and operation as a boost converter when the output voltage Vout and input voltage Vin are approximately equal.

In the present example, the first set of switches, comprises a first power switch 205, which may be referred to as a first high side power switch, and a first ground switch 210, which may be referred to as a first low side power switch, coupled to a first terminal of the inductor 215 via a first switching node LX1. The first switching node LX1 is at a first switching node voltage VLX1. A first gate driver 230 has a first output coupled to the first power switch 205 and a second output coupled to the first ground switch 210. The first power switch 205 receives the input voltage Vin and the first ground switch 210 is coupled to ground. The first power switch 205 is coupled to a first terminal of an input capacitor 221 that has a second terminal coupled to ground.

The buck-boost switching converter 200 further comprises a second set of switches, comprising a second power switch 206, which may be referred to as a second high side power switch, and a second ground switch 211, which may be referred to as a second low side switch, coupled to a second terminal of the inductor 215 via a second switching node LX2. The second switching node LX2 is at the second switching node voltage VLX2. A second gate driver 231 has a first output coupled to the second power switch 206 and a second output coupled to the second ground switch 211. The second power switch 206 has an output at the output voltage Vout and the second ground switch 211 is coupled to ground. The second power switch 206 is coupled to a first terminal of an output capacitor 220 that has a second terminal coupled to ground.

The output is coupled with the inductor 215 when the second power switch 206 is in a closed state, and the input is coupled with the inductor 215 when the first power switch 205 is in a closed state.

In the buck mode, the first set of switches operates to provide buck regulation while the second power switch 206 is held in the closed state. In the boost mode, the second set of switches operates to provide boost regulation while the first power switch 205 is held in the closed state.

The first switching node LX1 is coupled to an input of a first integration circuit 225. The input of the first integration circuit 225 receives the first switching node voltage VLX1, which may be referred to as a first voltage signal. The first integration circuit 225 outputs an integrated first switching node voltage ∫VLX1, which may be referred to as an integrated first voltage signal, at an output. The output of the first integration circuit 225 is coupled to a first input of a comparator 235 via a first transmission element 227.

The first integration circuit 225 comprises a first resistor R1 with a first terminal coupled to the first switching node LX1 and a second terminal coupled to a first terminal of a first capacitor C1 that has a second terminal coupled to ground. The first transmission element 227 comprises a first transmission capacitor CT1 with a capacitance that is smaller than C1. The capacitance of the first transmission capacitor CT1 may be, for example, 10% of the capacitance of the first capacitor C1. A first terminal of the first transmission capacitor CT1 is coupled to a node between the first resistor R1 and the first capacitor C1. A second terminal of the first transmission capacitor CT1 is coupled to the first input of the comparator 235.

The second switching node LX2 is coupled to an input of a second integration circuit 226. The input of the second integration circuit 226 receives the second switching node voltage VLX2, which may be referred to as a second voltage signal. The second integration circuit 226 outputs an integrated second switching node voltage ∫VLX2, which may be referred to as an integrated second voltage signal, at an output. The output of the second integration circuit 226 is coupled to a second input of the comparator 235 via a second transmission element 228.

The second integration circuit 226 comprises a second resistor R2 with a first terminal coupled to the second switching node LX2 and a second terminal coupled to a first terminal of a second capacitor C2 that has a second terminal coupled to ground. The second transmission element 228 comprises a second transmission capacitor CT2 with a capacitance that is smaller than C2. The capacitance of the second transmission capacitor CT2 may be, for example, 10% of the capacitance of the second capacitor C1. A first terminal of the second transmission capacitor CT2 is coupled to a node between the second resistor R2 and the second capacitor C2. A second terminal of the second transmission capacitor CT2 is coupled to the second input of the comparator 235.

In operation, the comparator 235 outputs control signals, at an output, to regulate the first set of switches in the buck mode, and to regulate the second set of switches in the boost mode. The comparator 235 may exhibit hysteresis, which would result in the buck-boost switching converter 200 being a hysteretic buck-boost switching converter.

The first terminal of the output capacitor 220 is coupled to an input of a feedback voltage circuit 229 which has an output at a feedback voltage Vfb. The feedback voltage circuit 229 may be implemented as a potential divider that comprises a first potential divider resistor RH1 with a first terminal coupled to the first terminal of the output capacitor 220 and a second terminal coupled to a first terminal of a second potential divider resistor RL1 that has a second terminal coupled to ground. The first potential divider resistor RH1 and the second potential divider resistor RL1 are coupled at a feedback node Nfb that is at the feedback voltage Vfb. The feedback node Nfb is coupled to the first input of a comparator 235.

An input of an impedance matching circuit 236 receives an initial reference voltage Vref0. An output of the impedance matching circuit 236 is at a reference voltage Vref.

The impedance matching circuit 236 comprises a first matching resistor RH2 coupled in parallel with a second matching resistor RL2 thereby forming a matching resistor pair. A first resistance, corresponding to a parallel combination of the first matching resistor RH2 and the second matching resistor RL2 is equal to a second resistance, corresponding to a parallel combination of the first potential divider resistor RH1 and the second potential divider resistor RL1. For example, this may correspond to the first matching resistor RH2 and the first potential divider resistor RH1 being equal; and the second matching resistor RL2 and the second potential divider resistor RL1 being equal. A first terminal of the matching resistor pair receives an initial reference voltage Vref0. A second terminal of the matching resistor pair is at Vref and is coupled to the second input of the comparator 235. The impedance matching circuit 236 ensures that the impedance seen by CT1 is the same as the impedance seen by CT2.

The output of the voltage feedback circuit 229 and the second terminal of the first transmission capacitor CT1 are coupled to the first input of a comparator 235. The output of the impedance matching circuit 236 and the second terminal of the second transmission capacitor CT2 are coupled to the second input of the comparator 235. The feedback voltage Vfb comprises contributions from the output voltage Vout, and the integrated first switching node voltage ∫VLX1. The reference voltage Vref comprises contributions from the initial reference voltage Vref0, and the integrated second switching node voltage ∫VLX2.

The buck-boost switching converter 200 comprises a controller that is arranged to send the control signals to the first set of switches and the second set of switches. The controller receives the control signals from the comparator 235. The controller is arranged to selectively operate the buck-boost switching converter 200 in the buck mode or the boost mode based on a length of a time period throughout the course of which both of the first power switch 205 and the second power switch 206 are in a similar state. In the present example, the similar state is when the power switches 205, 206 are in the closed state.

When operating in the buck mode, the controller is arranged to switch the buck-boost switching converter 200 to the boost mode if the time period during which both switches 205, 206 are in the similar state exceeds a first threshold. When operating in the boost mode, the controller is arranged to switch the buck-boost switching converter 200 to the buck mode if the time period during which both switches 205, 206 are in the similar state exceeds a second threshold. The first and second thresholds may be the same, for example a time of 300 ns.

The controller comprises a demultiplexer 240. An output of the comparator 235 is coupled to a first input of the demultiplexer 240, such that the first input of the demultiplexer 240 receives the control signals. The demultiplexer 240 has a first demultiplexer state 241, in which the first input of the demultiplexer is coupled to a first output, and a second demultiplexer state 242, in which the first input of the demultiplexer 240 is coupled to a second output. The first output of the demultiplexer 240 is coupled to an input of the first gate driver 230 and the second output of the switching circuit is coupled to an input of the second gate driver 231.

In the present example, the buck mode corresponds to operation of the buck-boost converter 200 as a buck converter. In the buck mode, the demultiplexer 240 is in the first demultiplexer state 241 and the output of the comparator 235 is coupled to the first gate driver 230, such that the controls signals are provided to the first set of switches. The first gate driver 230 drives the switching operation of the first power switch 205 and the first ground switch 210 based on a signal generated by the comparator 235. During buck mode, the second power switch 206 is closed and the second ground switch 211 is open.

In the present example, the boost mode corresponds to operation of the buck-boost converter 200 as a boost converter. In the boost mode, the demultiplexer 240 is in the second demultiplexer state 242 and the output of the comparator 235 is coupled to the second gate driver 231, such that the control signals are provided to the second set of switches. The second gate driver 231 drives the switching operation of the second power switch 206 and the second ground switch 211 based on a signal generated by the comparator 235. During boost mode, the first power switch 205 is closed and the first ground switch 210 is open.

The demultiplexer 240 is arranged to operate in the first demultiplexer state 241 or the second demultiplexer state 242 based on the length of the time period throughout the course of which both of the first power switch 205 and the second power switch 206 are in the similar state, for example the closed state.

The output of the comparator 235 is dependent on the comparison of the feedback voltage Vfb and the reference voltage Vref.

In operation, the first integration circuit 225 integrates the first switching node voltage VLX1 at the first switching node LX1 to yield the integrated first switching node voltage ∫VLX1. The integrated first switching node voltage ∫VLX1 corresponds to the AC characteristics of the inductor 215 when operating in the buck mode. The first transmission element 227 is used to stack the integrated first switching node voltage ∫VLX1 on to the feedback voltage Vfb. Therefore the feedback voltage Vfb comprises a contribution from the output voltage Vout, as set by the feedback voltage circuit 229, and the integrated first switching node voltage ∫VLX1.

In operation, the second integration circuit 226 integrates the second switching node voltage VLX2 at the second switching node LX2 to yield the integrated second switching node voltage ∫VLX2. The integrated second switching node voltage ∫VLX2 corresponds to the AC characteristics of the inductor 215 when operating in the boost mode. The second transmission element 228 is used to stack the integrated second switching node voltage ∫VLX2 on to the reference voltage Vref. Therefore, the reference voltage Vref comprises a contribution from the initial reference voltage Vref0, as set by the impendance matching circuit 236, and the integrated second switching node voltage ∫VLX2. As the integrated first switching node voltage ∫VLX1 is a component of the feedback voltage Vfb and the integrated second switching node voltage ∫VLX2 is a component of the reference voltage Vref, a decreasing Vref is equivalent to an increasing Vfb in the operation of the comparator 235.

It is not possible to operate the switching converter 200 by stacking the integrated second switching node voltage ∫VLX2 on the feedback voltage Vfb as a negative ripple would be stacked on the feedback voltage Vfb. This would result in energy being built up in the inductor 215 as the inductor current IL increases. The energy is not transmitted to the output, therefore leading to a decreasing output voltage Vout. In response, the comparator 235 would attempt to increase the output voltage Vout, however as the energy would not be transmitted to the output, the switching converter 200 would not be able to adjust the output voltage Vout.

Figure 11:
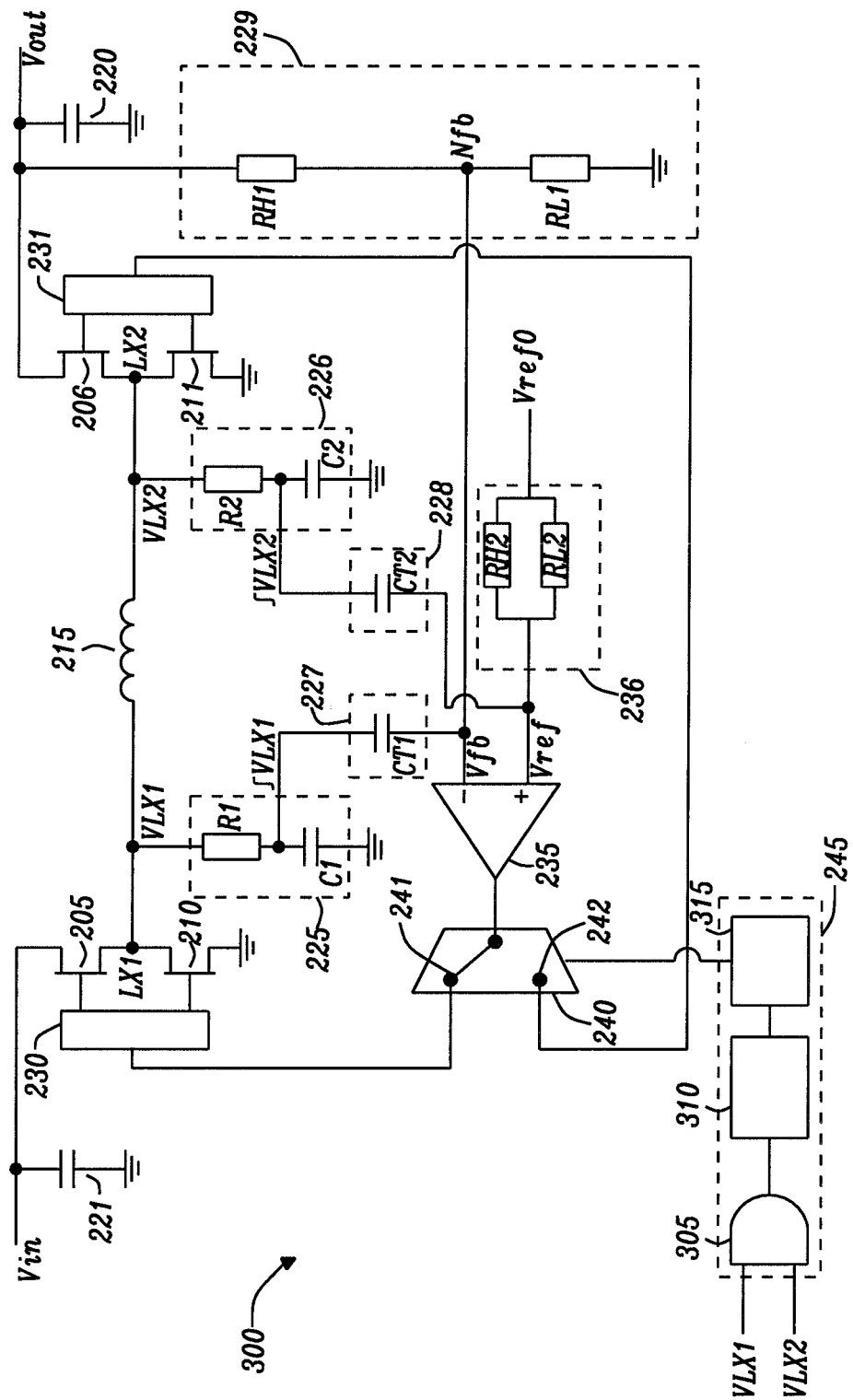
FIG. 11 is a schematic diagram of a buck-boost switching converter in accordance with a second embodiment of this disclosure.

FIG. 11 is a schematic of a second embodiment of a buck-boost switching converter 300 in accordance with the disclosure. The buck-boost switching converter 300 receives an input voltage Vin and uses a sensor-less method to provide a regulated output voltage Vout. The buck-boost switching converter 300 is arranged to operate in a buck mode or a boost mode. Common features between the buck-boost switching converter 300 and the buck-boost switching converter 200 of FIG. 10 share common reference numerals. The operation relating to common features between the first and second embodiments will not be repeated, as the description of the first embodiment may be referred to for understanding the operation of further embodiments.

In addition to the common features between the buck-boost switching converter 300 and the buck-boost switching converter 200, the controller of the buck boost switching converter 300 further comprises a decision circuit 245.

When operating in the buck mode, the decision circuit 245 is arranged to provide a first mode signal that switches the buck-boost switching converter 300 to the boost mode if the time period during which both of the first power switch 205 and the second power switch 206 are in the similar state exceeds the first threshold.

When operating in the boost mode, the decision circuit 245 is arranged to provide a second mode signal to switch the buck-boost switching converter 300 to the buck mode if the time period during which both of the first power switch 205 and the second power switch 206 are in the similar state exceeds the second threshold.

In this embodiment the similar state is a closed state, and the first and second thresholds are equal.

The decision circuit 245 has a first input coupled to the first switching node LX1 and receives the first switching node voltage VLX1. The decision circuit 245 has a second input coupled to the second switching node LX2 and receives the second switching node voltage VLX2. An output of the decision circuit 245 is coupled to a second input of the demultiplexer 240. In operation the output of the decision circuit 245 provides a mode signal to control the state of the demultiplexer 240. If the demultiplexer 240 receives the first mode signal from the decision circuit 245, the demultiplexer 240 switches from the first demultiplexer state 241, corresponding to the switching converter 300 operating in the buck mode, to the second demultiplexer state 242, corresponding to the switching converter 300 operating in the boost mode. If the demultiplexer 240 receives the second mode signal from the decision circuit 245, the demultiplexer 240 switches from the second demultiplexer state 242, corresponding to the switching converter 300 operating in the boost mode, to the first demultiplexer state 241, corresponding to the switching converter 300 operating in the buck mode.

The decision circuit 245 comprises an AND gate 305, a timing circuit 310 and a mode circuit 315. The AND gate 305 has a first input coupled to the first switching node LX1 for receiving the first switching node voltage VLX1. The AND gate 305 has a second input coupled to the second switching node LX2 for receiving the second switching node voltage VLX2. An output of the AND gate 305 is coupled to an input of the timing circuit 310. An output of the timing circuit 310 is coupled to an input of the mode circuit 315. An output of the mode circuit 315 is coupled to the second input of the demultiplexer 240.

Each of the switching nodes LX1, LX2 may be coupled to the AND gate via a high-state detector, for example a Schmitt trigger.

In operation, the AND gate 305 outputs a high signal to the timing circuit 310 if both inputs of the AND gate 305 receive a high signal from the first and second switching node voltages VLX1, VLX2. A high signal at a first input of the AND gate 305 may correspond to a logic 1 for a first condition, in which the first switching node voltage VLX1 exceeds a threshold value. This occurs when the first power switch 205 is closed and the first ground switch 210 is open. A low signal may correspond to a logic 0 for a second condition, in which the first switching node voltage VLX1 is below a threshold value. This occurs when the first power switch 205 is open and the first ground switch 210 is closed. A high signal at a second input of the AND gate 305 may correspond to a logic 1 for a first condition, in which the second switching node voltage VLX2 exceeds a threshold value. This occurs when the second power switch 206 is closed and the second ground switch 211 is open. A low signal may correspond to a logic 0 for a second condition, in which the second switching node voltage VLX2 is below a threshold value. This occurs when the second power switch 206 is open and the second ground switch 211 is closed. Consequently, a high signal may be received at both inputs of the AND gate 305 when the first power switch 205 and the second power switch 206 are closed, and the first ground switch 210 and the second ground switch 211 are open.

When a high signal is received at both inputs of the AND gate 305 a high signal, for example logic 1, is output to the timing circuit 310. The timing circuit 310 comprises a timing function, wherein if a high signal is received at the input and the high signal is unchanged for a time period, for example 300 ns, the timing circuit 310 outputs a signal to the mode circuit 315. In response to the signal, the mode circuit 315 switches operation of the buck-boost switching converter 300 from the buck mode to the boost mode or from the boost mode to the buck mode. The time period required to switch from buck mode to boost mode may be different from the time period required to switch from boost mode to buck mode. This corresponds to the first threshold and the second threshold as defined previously. Alternatively, the time period may be the same in both cases. The timing circuit 310 may be implemented using a resistor-capacitor delay circuit.

As the duration of the time period which both switches are closed is the criterion to switch modes, switching between modes is independent of the switching frequency of the control signals used to operate the first set of switches and the second set of switches. It will be appreciated that the time period may be a time other than 300 ns. Adjusting the time period may be used to adjust the input voltage VIN and output voltage VOUT values over which the switching converter 300 operates in the buck-boost mode.

In the present embodiment, the mode circuit 315 switches operation of the buck-boost switching converter 300 by outputting a high signal or a low signal to the demultiplexer 240 in response to the signal received from the timing circuit 310. The high signal corresponds to the first mode signal as described previously, and the low signal corresponds to the second mode signal as described previously.

The mode circuit 315 may be a memory element that receives the signal from the timing circuit 310, and in response to receiving the signal from the timing circuit 310 switches the mode of operation of the buck-boost switching converter 300.

When the demultiplexer 240 receives a high signal from the mode circuit 315, the state of the demultiplexer is switched to the second demultiplexer state 242, corresponding to the buck-boost converter operating in the boost mode, as a boost converter. When the demultiplexer 240 receives a low signal from the mode circuit 315, the state of the demultiplexer 240 is switched to the first demultiplexer state 241, corresponding to the buck-boost converter operating in the buck mode as a buck converter.

The signal is used to change the state of the demultiplexer 240 as follows: if the demultiplexer 240 is in the first demultiplexer state 241 it will switch to the second demultiplxer state 242, and if the demultiplexer 240 is in the second demultiplxer state 242 it will switch to the first demultiplexer state 241. For example, if the first power switch 205 and the second power switch 206 are closed for a time period of 300 ns then the timing circuit 310 will send a signal to the mode circuit 315 which will send a signal to the demultiplexer 240 and the demultiplexer 240 will change state. Buck-boost mode operation corresponds to the case where switching between the two states occurs after every time period cycle.

Figure 12:
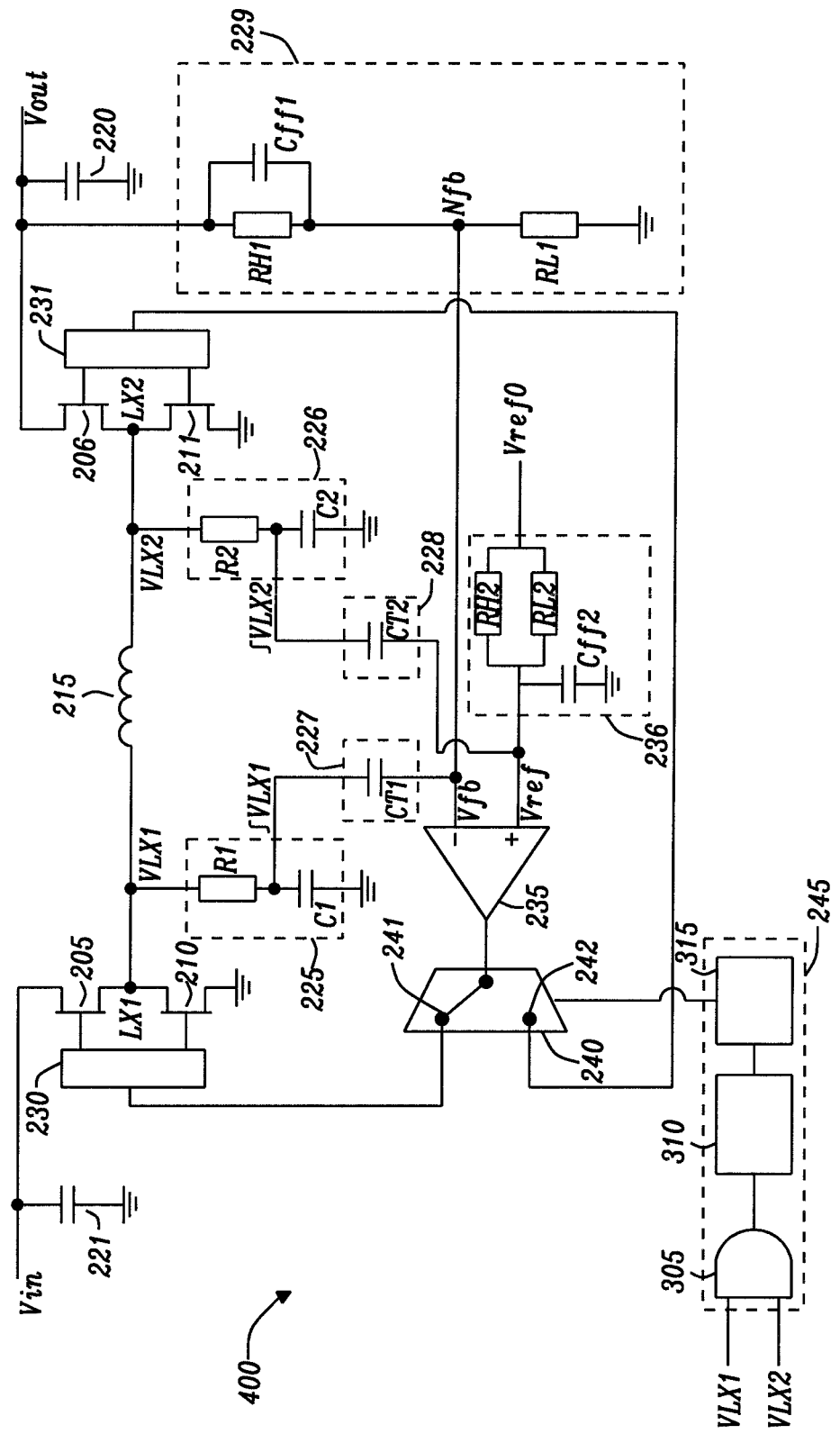
FIG. 12 is a schematic diagram of a buck-boost switching converter in accordance with a third embodiment of this disclosure.

FIG. 12 shows a diagram of third embodiment of the buck-boost switching converter 400 that uses a sensor-less method to regulate an output voltage Vout.

The buck-boost switching converter 400 is as was described in FIG. 11, however in this case the voltage feedback circuit 229 and the impedance matching circuit 236 are implemented as follows. The voltage feedback circuit 229 comprises a feedforward capacitor Cff1 coupled in parallel with the first potential divider resistor RH1. The impedance matching circuit 236 circuit comprises a matching capacitor Cff2 coupled to the second terminal of the matching resistor pair, in which Cff1=Cff2. The inclusion of the Cff1 and Cff2 improves the transient response of the buck-boost switching converter 400.

Figure 13:
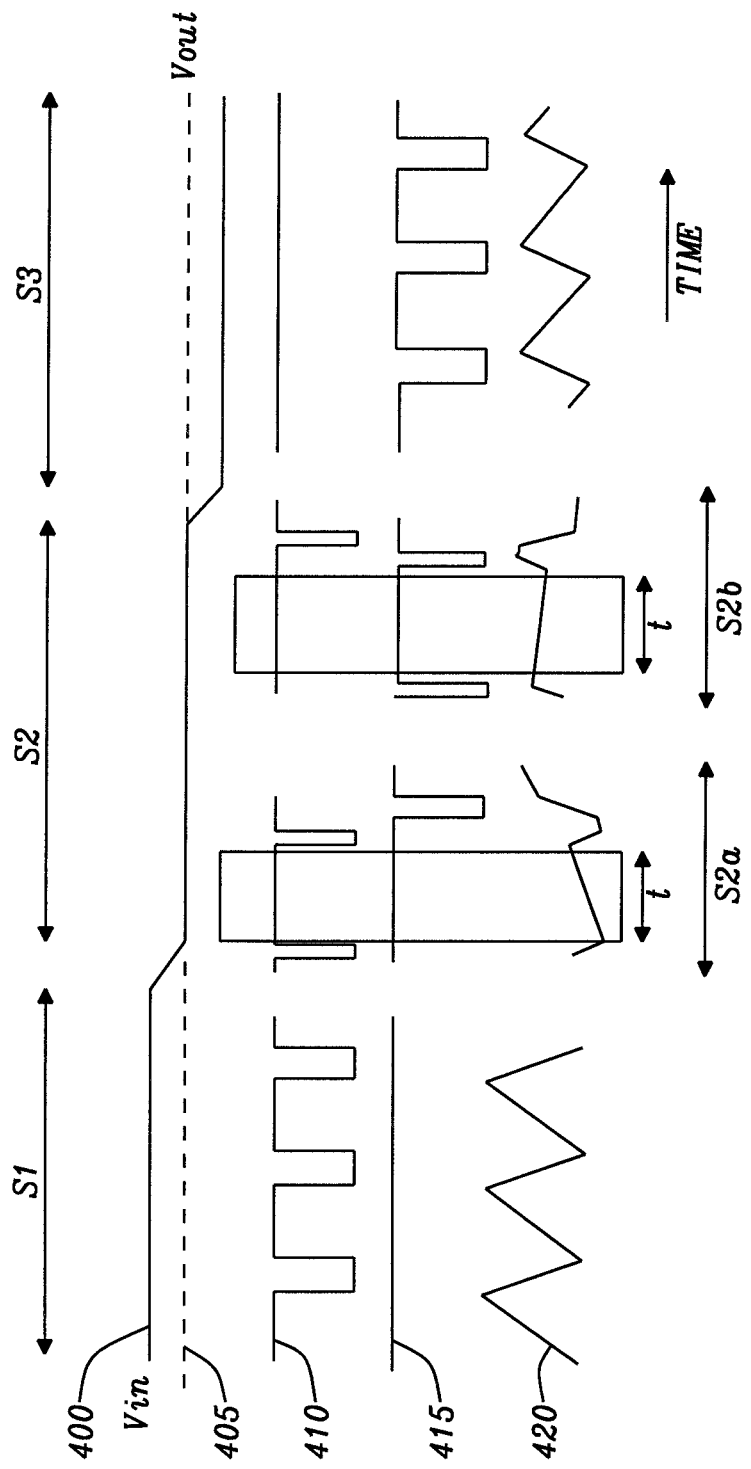
FIG. 13 is a graph showing the operation of the buck-boost switching converter of FIG. 11.

FIG. 13 shows a time chart of the buck-boost switching converter 300 as shown in FIG. 11 during operation, for different input voltages Vin 400 relative to the output voltage Vout 405. The following profiles are also shown: a state of the first switching node LX1 410, a state of the second switching node LX2 415 and the AC component of the inductor current 420. The state of the first switching node LX1 410 is a high signal, for example logic 1, when the first power switch 205 is closed and the first ground switch 210 is open. The state of the first switching node LX1 410 is a low signal, for example logic 0, when the first power switch 205 is open and the first ground switch 210 is closed. The state of the second switching node LX2 415 is a high signal when the second power switch 206 is closed and the second ground switch 211 is open. The state of the second switching node LX2 415 is a low signal when the second power switch 206 is open and the second ground switch 211 is closed.

At a section S1, the input voltage Vin 400 is substantially greater than the output voltage Vout 405. The first power switch 205 and the first ground switch 210 undergo switching operation 410. The second power switch 206 is closed, as shown by the state of the second switching node LX2 415. Under these circumstances the buck-boost switching converter operates as a buck converter. The AC component of the inductor current 420 is characteristic of a voltage ripple that is provided by the integrated first switching node voltage ∫VLX1 to the feedback voltage Vfb during buck converter operation. As the slope of the integrated first switching node voltage ∫VLX1 is sufficiently steep once stacked on the feedback voltage Vfb, it intercepts the reference voltage Vref within a sufficiently short time period to remain operating as a buck converter.

The slope of the inductor current 420 is given by the following equation:

$$\frac{dI}{dt} = \frac{Vin - Vout}{L}$$

where dI is a change in the inductor current over a time period dt, Vin is the input voltage Vin, Vout is the output voltage Vout and L is the inductance of the inductor 215.

At a section S3, the input voltage Vin 400 is substantially less the output voltage Vout 405. The second power switch 206 and the second ground switch 211 undergo switching operation 415. The first power switch 205 is closed 410. Under these circumstances the buck-boost switching converter operates as a boost converter. The AC component of the inductor current 420 is characteristic of a voltage ripple that is provided by the integrated second switching node voltage ∫VLX2 to the reference voltage Vref during boost converter operation. As the slope of the integrated second switching node voltage ∫VLX2 is sufficiently steep, it intercepts the feedback voltage Vfb within a sufficiently short time period to remain operating as a boost converter.

At section S2, the input voltage Vin 400 is approximately equal to the output voltage Vout 405. At section S2a the converter is initially operating as a buck converter. The AC component of the inductor current 420 is characteristic of a voltage ripple that is provided by the integrated first switching node voltage ∫VLX1 to the feedback voltage Vfb during buck converter operation. As the slope of the integrated first switching node voltage ∫VLX1 is not sufficiently steep, it does not intercept the reference voltage Vref within a sufficiently short time period to remain operating as a buck converter. The first power switch 205 and the second power switch 206 are both closed for the time period, t, as defined in the discussion of the decision circuit 245. As the time period, t, has been exceeded while both power switches 205, 206 are high 410, 415, the decision circuit 245 outputs a signal to the demultiplexer 240, in which the demultiplexer 240 is changed from the first demultiplexer state 241 corresponding to buck converter operation to the second demultiplexer state 242 corresponding to boost converter operation.

At section S2b the converter is initially operating as a boost converter. The AC component of the inductor current 420 is characteristic of a voltage ripple that is provided by the integrated second switching node voltage ∫VLX2 to the reference voltage Vref during boost converter operation. As the slope of the integrated second switching node voltage ∫VLX2 is not sufficiently steep, it does not intercept the feedback voltage Vfb within a sufficiently short time period to remain operating as a boost converter. The first power switch 205 and the second power switch 206 are both closed for the time period, t, as defined in the discussion of the decision circuit 245. As the time period, t, has been exceeded while both power switches 205, 206 are high 410, 415, the decision circuit 245 outputs a signal to the demultiplexer 240, wherein the switching circuit 240 is changed from the second demultiplexer state 242 corresponding to boost converter operation to the first demultiplexer state 241 corresponding to buck converter operation.

At section S2 the condition necessary for the decision circuit 245 to alter the state of the demultiplexer 240 will always be met and therefore after each cycle of the time period, t, the switching converter will repeatedly cycle between buck converter operation and boost converter operation, thereby operating as a buck-boost converter.

Figure 14:
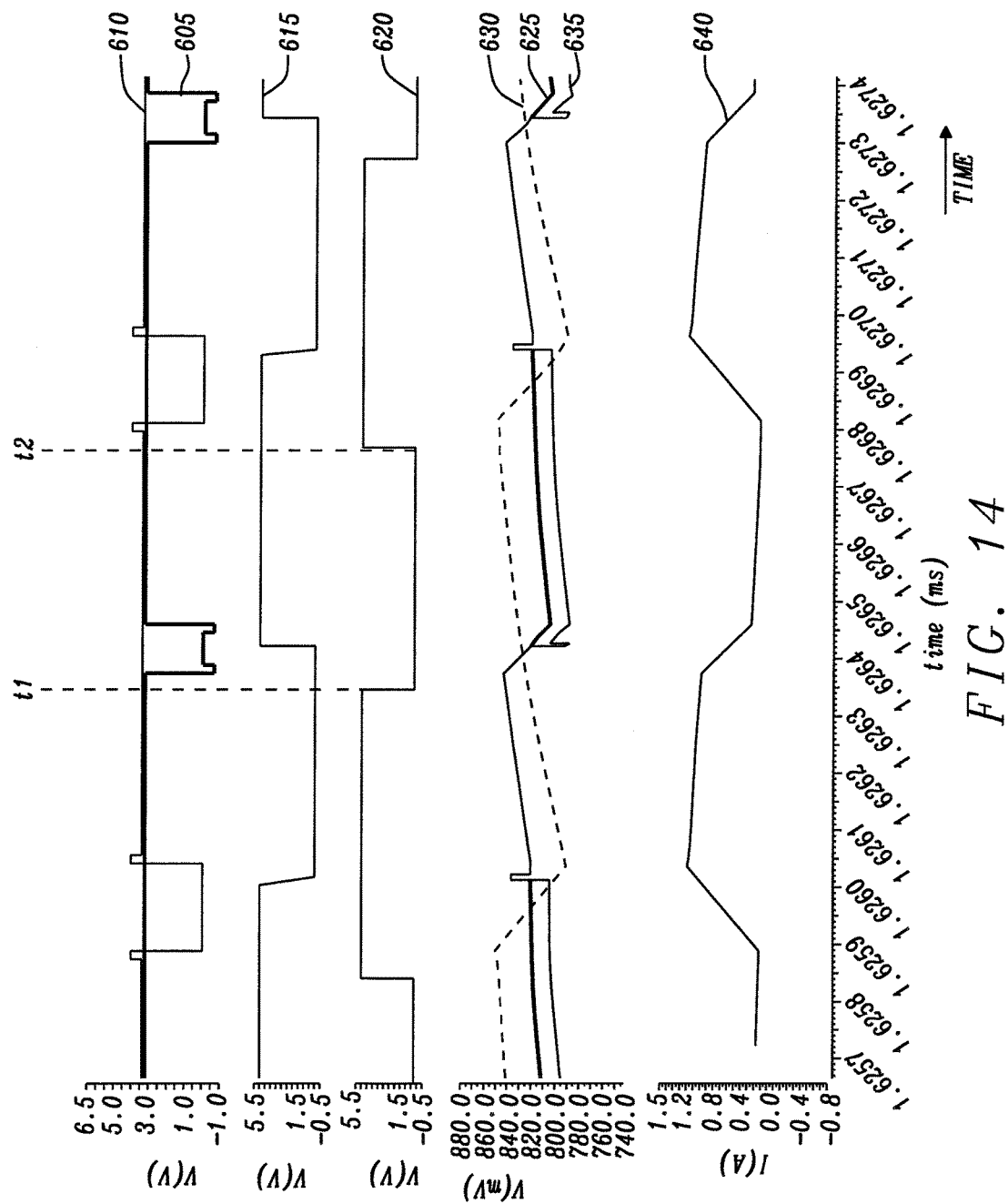
FIG. 14 is a first graph of simulation results relating to operation of the buck-boost switching converter of FIG. 11.

FIG. 14 is a first graph of simulation results of the circuit presented in FIG. 11, in which the output voltage Vout and the input voltage Vin are approximately equal. Therefore, under these conditions the buck-boost switching converter 400 is alternating between operating as a buck converter and a boost converter. The following features are shown: state of the first switching node LX1 605, state of the second switching node LX2 610, state of magnetise 615, state of boost mode 620, the feedback voltage Vfb 625, the reference voltage Vref 630, a hysteresis voltage VOUT_COMP 635 and inductor current 640.

The hysteresis voltage VOUT_COMP 635 is an internal state of the comparator 235 that shows what the comparator 235 sees on its first input, due to hysteresis. For example, if the state of magnetise 615 is high, then the comparator 235 sees an input at the first input that is smaller than the feedback voltage Vfb; and if the state of magnetise 615 is low, then the comparator 235 sees the feedback voltage Vfb at the first input.

The hysteresis voltage VOUT_COMP 635 is effectively a replica of the feedback voltage Vfb 625, but with the inclusion of a hysteresis effect. Consequently, in operation, the comparator 235 compares the hysteresis voltage VOUT_COMP 635 and the reference voltage Vref 630.

The state of the first switching node LX1 605 is high when the first power switch 205 is closed and the first ground switch 210 is open. The state of the first switching node LX1 605 is low when the first power switch 205 is open and the first ground switch 210 is closed. The state of the second switching node LX2 610 is high when the second power switch 206 is closed and the second ground switch 211 is open. The state of the second switching node LX2 610 is low when the second power switch 206 is open and the second ground switch 211 is closed.

When boost mode 620 is high, the buck-boost switching converter is operating as a boost converter and when boost mode 620 is low, the buck-boost switching converter is operating as a buck converter.

Magnetise 615 is the output of the comparator 235 and therefore corresponds to the control signals, as defined previously. The magnetise signal 615 is applied to the first gate driver 230 when the boost mode 620 signal is low and the magnetise signal 615 is applied to the second gate driver 231 when the boost mode 620 signal is high. The switching operation shown by the magnetise signal 615 is controlled by the feedback voltage Vfb 625 and the reference voltage Vref 630, in which switching occurs when Vfb 625 and Vref 630 overlap.

A high magnetise signal 615 applied to the first gate driver 230, corresponding to the buck-boost switching converter operating as a buck converter, corresponds to the first power switch 205 being closed and the first ground switch 210 being open. The state of the first switching node LX1 605 is high. A low magnetise signal 615 applied to the first gate driver 230 corresponds to the first power switch 205 being open and the first ground switch 210 being closed. The state of the first switching node LX1 605 is low. Whilst operating as a buck converter, the second power switch 206 remains closed and the second ground switch 211 remains open.

A high magnetise signal 615 applied to the second gate driver 231, corresponding to the buck-boost switching converter operating as a boost converter, corresponds to the second power switch 206 being open and the second ground switch 211 being closed. The state of the second switching node LX2 610 is low. A low magnetise signal 615 applied to the second gate driver 231 corresponds to the second power switch 206 being closed and the second ground switch 211 being open. The state of the second switching node LX2 610 is high. Whilst operating as a boost converter, the first power switch 205 remains closed and the first ground switch 210 remains open.

Immediately prior to a time t1, the boost mode signal 620 is high and the buck-boost switching converter is operating as a boost converter. The magnetise signal 615 is applied to the second gate driver 231. As the input voltage Vin and the output voltage Vout are approximately equal, the state of the switching nodes LX1 605 and LX2 610 remain high for the time period of 300 ns such that the boost mode 620 state is switched, at the time t1, in accordance with the circuit shown in FIG. 11.

Prior to switching of the boost mode signal, the discharging inductor current 640 has a smooth slope identified by its small gradient, and the comparator inputs, namely the hysteresis voltage VOUT_COMP 635 and the reference voltage Vref 630 do not cross.

Between the time t1 and a time t2, the buck-boost switching converter is operating as a buck converter and the magnetise signal 615 is applied to the first gate driver 230. At time t1, the low magnetise signal 615 results in the state of the first switching node LX1 605 changing to low and the inductor 640 is discharged with a steeper slope than the smooth slope immediately prior to the time t1. Consequently, the hysteresis voltage VOUT_COMP 635 and the reference voltage Vref 630 cross, and the magnetise signal 615 is switched, resulting in LX1 605 returning to a high state. The inductor 640 once again discharges with a smooth slope and the reference voltage Vref 630 and the feedback voltage Vfb 625 do not cross within the time period of 300 ns.

At the time t2 the boost mode 620 switches to a high state and the buck-boost switching converter operates as a boost converter. The magnetise signal 615 is applied to the second gate driver 231, and the high signal results in the second switching node LX2 610 switching to low. The inductor current 640 increases and the reference voltage Vref 630 and the hysteresis voltage VOUT_COMP 635 cross, resulting in the switching of the magnetise signal 615. The low magnetise signal 615 results in LX2 610 returning to a high state.

The cycle described for FIG. 14 repeats and corresponds to the buck-boost switching converter operating as a buck-boost converter for the case where the output voltage Vout and the input voltage Vin are approximately equal.

Figure 15:
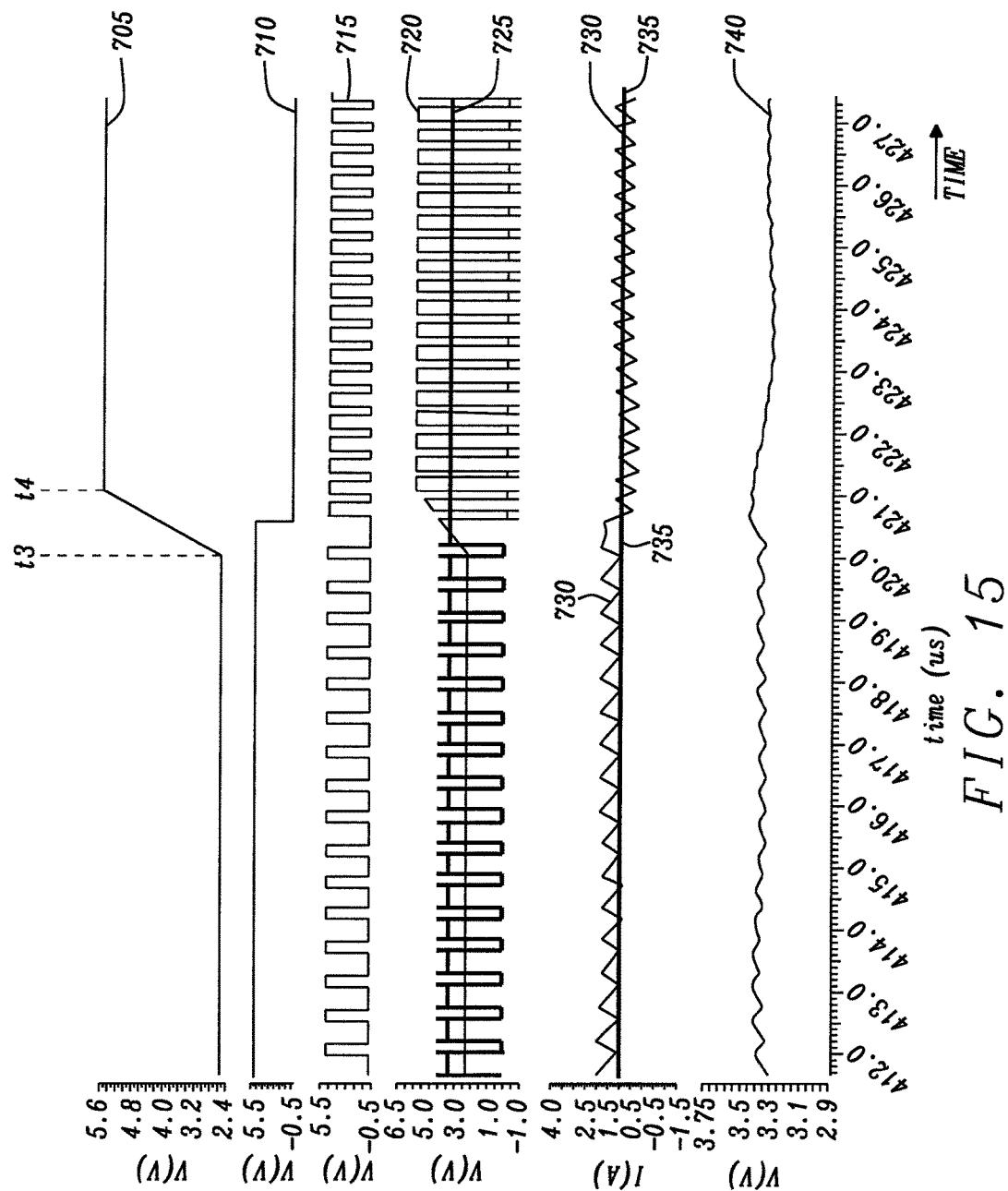
FIG. 15 is a second graph of simulation results relating to operation of the buck-boost switching converter of FIG. 11.

FIG. 15 is a second graph of simulation results of the circuit presented in FIG. 11, in which the input voltage Vin suddenly transitions from a value less than the output voltage Vout to a value greater than the output voltage Vout. The following features are shown: the input voltage Vin 705, state of the boost mode 710, state of magnetise 715, state of the first switching node LX1 720, state of the second switching node LX2 725, inductor current 730, load current 735 and the output voltage Vout 740.

Prior to a time t3, the input voltage Vin is at 2.5V which is substantially less than the output voltage of the buck-boost switching converter. Consequently, the buck-boost switching converter is operating as a boost converter. This is also illustrated by the high state of the boost mode signal 710 and the switching of the state of the second switching node LX2 725 whilst the state of the first switching node LX1 720 remains fixed. From the time t3 to a time t4, which is 1 µs, the input voltage Vin increases to 5.5V. During this transition period, the state of the boost mode 710 switches to a low state and the buck-boost converter operates as a buck converter. This is shown by the switching of the state of the first switching node LX1 720 whilst the state of the second switching node LX2 725 remains fixed.

Figure 16A:
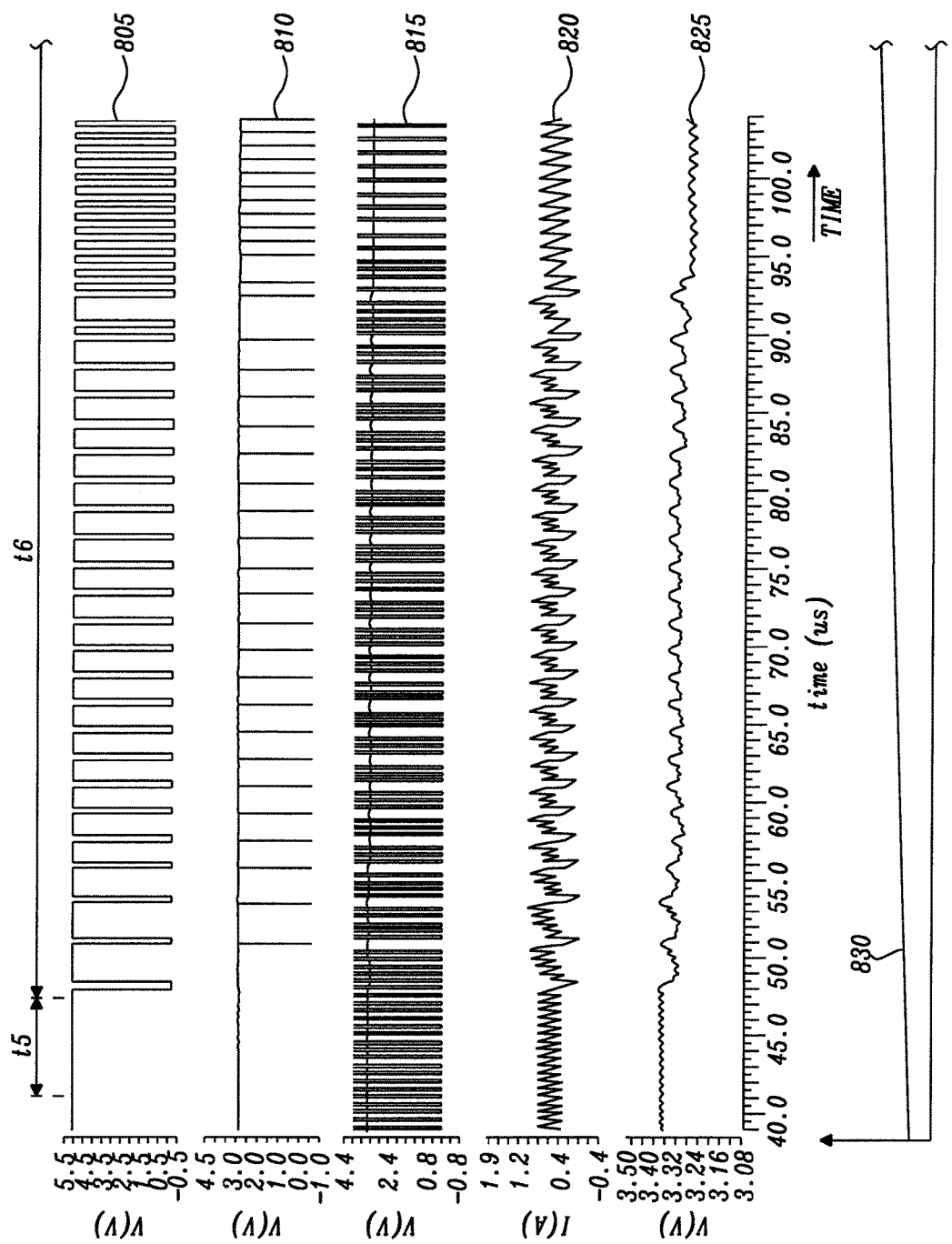
FIGS. 16A and 16B present a third graph of simulation results relating to operation of the buck boost switching converter of FIG. 11.
Figure 16B:
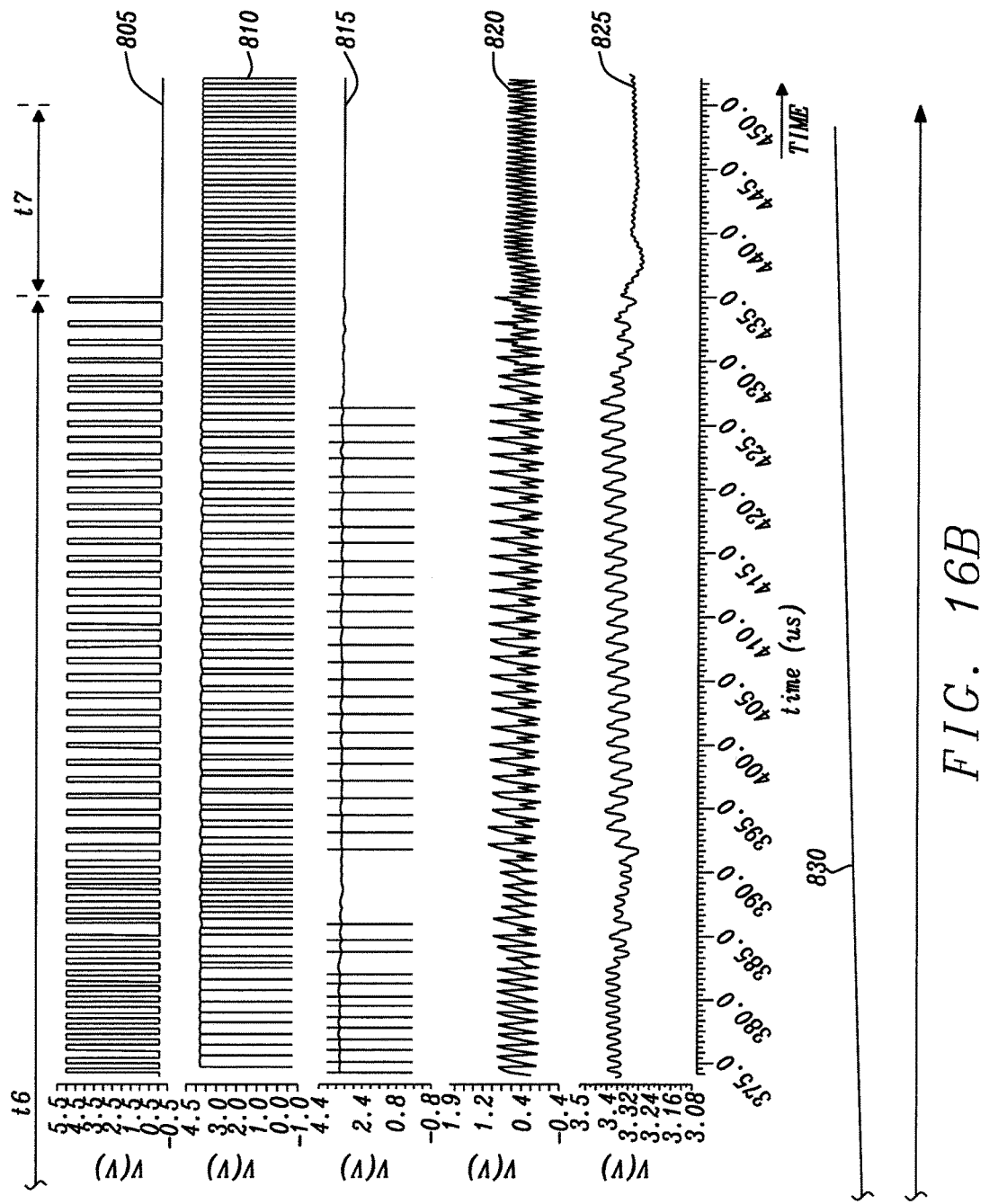

FIGS. 16A and 16B show a third graph of simulation results of the circuit presented in FIG. 11, in which the input voltage Vin gradually increases from a value less than the output voltage Vout, to a value greater than the output voltage Vout. The following features are shown: state of the boost mode 805, state of the first switching node LX1 810, state of the second switching node LX2 815, inductor current 820, output voltage 825 and input voltage 830.

At a time period t5, the input voltage Vin is substantially less than the output voltage Vout and the buck-boost converter operates in the boost mode. The state of the boost mode 805 is high, the state of the first switching node LX1 810 is high and the state of the second switching node LX2 815 illustrates the switching operation associated with the converter operating as a boost converter.

At a time period t6 the input voltage Vin 830 has increased to a range of values such that the state of the boost mode 810 alternates between high and low. At the time t6 the buck-boost converter alternates between buck converter operation and boost converter operation as shown by the state of the first switching node LX1 810 and the state of the second switching node LX2 815.

At a time period t7, the input voltage Vin is substantially greater than the output voltage Vout and the buck-boost converter operates in the buck mode. The state of the boost mode 805 is low, the state of the second switching node LX2 815 is high and the state of the first switching node LX1 810 illustrates the switching operation associated with the converter operating as a buck converter.

Figure 17:
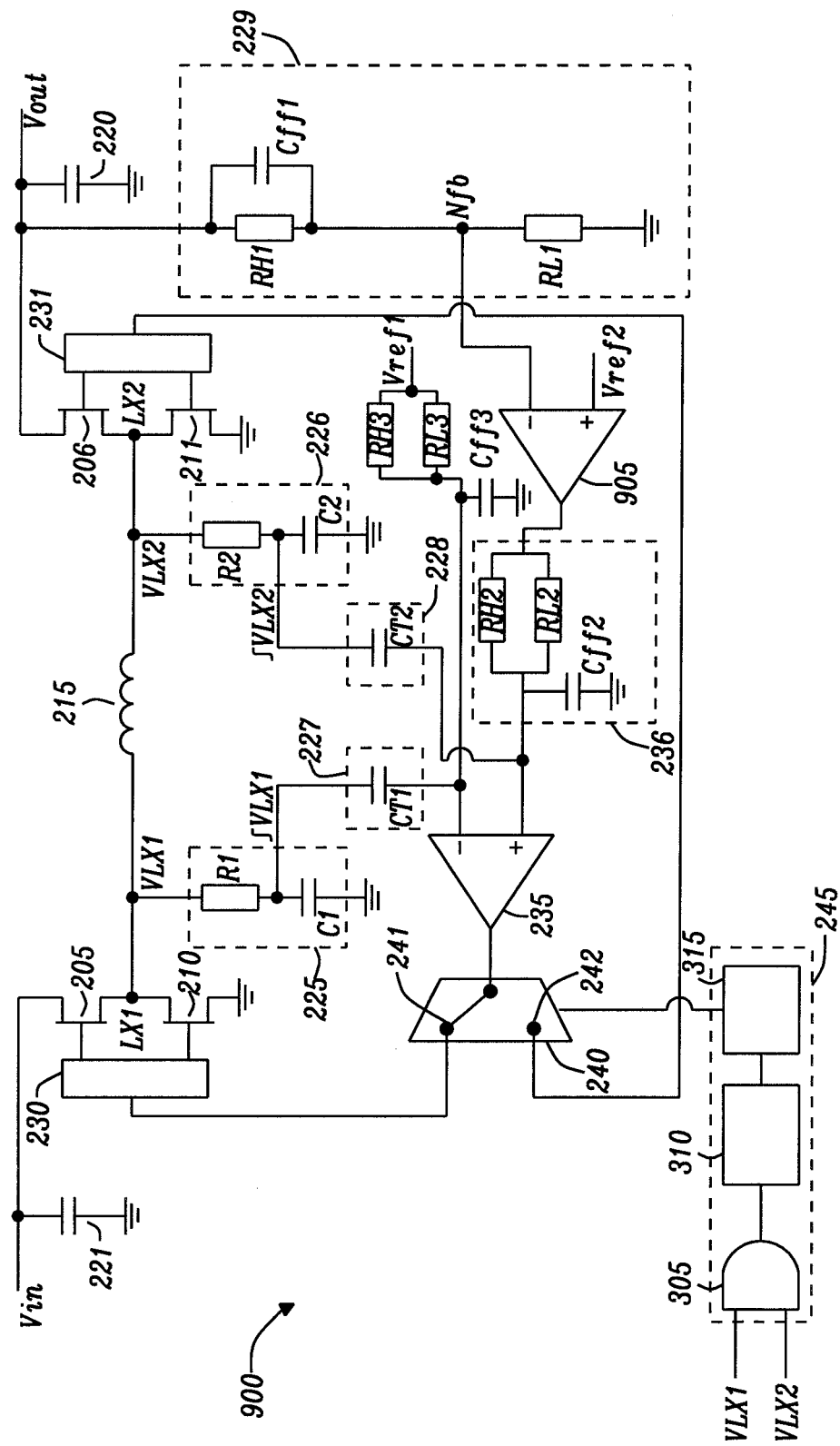
FIG. 17 is a schematic diagram of a buck-boost switching converter in accordance with a fourth embodiment of this disclosure.

FIG. 17 shows a diagram of a fourth embodiment of the buck-boost switching converter 900 that uses a sensor-less method to regulate an output voltage Vout. The buck-boost switching converter 900 is as was described in FIG. 11, however the inputs of the comparator 235 are different from as described previously. The first input is coupled a first terminal of a matching capacitor Cff3, a first terminal of a third matching resistor RH3 and a first terminal of a fourth matching resistor RL3. A second terminal of the matching capacitor Cff3 is coupled to a ground. A second terminal of the third matching resistor RH3 is coupled to a second terminal of the fourth matching resistor RL3. The second terminals of the third matching resistor RH3 and the fourth matching resistor RL3 are coupled to a fixed voltage source at a first reference voltage Vref1. The matching capacitor Cff3, the third matching resistor RH3 and the fourth matching resistor RL3 are used to provide an impedance matching function for the first reference voltage Vref1. The matching capacitor Cff2 is matched to the matching capacitor Cff3, as is achieved if Cff2=Cff3. The feedforward capacitor Cff1 is optional and may be omitted. Additionally, the matching capacitor Cff2 and the matching capacitor Cff3 are optional, and one or both may be omitted.

The input of the impedance matching circuit 236 is coupled to an output of a front end error amplifier 905. A first input of the front end error amplifier 905 is coupled to the feedback node Nfb and a second input of the front end error amplifier 905 receives a second reference voltage Vref2.

The above embodiments demonstrate implementations of a buck-boost switching converters comprising analog blocks, a comparator, simple RC networks and a 300 ns timer, which achieves the same performance as more complex buck-boost switching converters. In particular there is no requirement for a complex system to manage transitions between different operational modes.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A buck-boost switching converter with an input for receiving an input voltage and an output for providing an output voltage, comprising:
   a first set of switches comprising a first power switch and a first ground switch;
   a second set of switches comprising a second power switch and a second ground switch;
   a controller arranged to send control signals to the first set of switches and the second set of switches and arranged such that:
   in a buck mode, the first set of switches operates to provide buck regulation while the second power switch is held in a closed state;
   in a boost mode, the second set of switches operates to provide boost regulation while the first power switch is held in a closed state; and
   the controller is configured to detect when the first power switch and the second power switch are in a similar state and to selectively operate the buck-boost switching converter in the buck mode or the boost mode based on a length of a time period throughout the course of which both of the first power switch and the second power switch are in a similar state.

2. The buck-boost switching converter of claim 1, wherein
   when operating in the buck mode, the controller is arranged to switch the buck-boost switching converter to the boost mode if the time period during which both of the first power switch and the second power switch are in a similar state exceeds a first threshold; and when operating in the boost mode, the controller is arranged to switch the buck-boost switching converter to the buck mode if the time period during which both of the first power switch and the second power switch are in a similar state exceeds a second threshold.

3. The buck-boost switching converter of claim 2, wherein the first and second thresholds are the same.

4. The buck-boost switching converter of claim 1, wherein the buck-boost switching converter comprises an energy storage element, the output is coupled with the energy storage element when the second power switch is in a closed state, and the input is coupled with the energy storage element when the first power switch is in a closed state.

5. The buck-boost switching converter of claim 1, wherein the similar state is a closed state.

6. The buck-boost switching converter of claim 4, wherein the energy storage element is an inductor.

7. The buck-boost switching converter of claim 6, comprising:
    an input of a first integration circuit coupled to a first terminal of the inductor, the first integration circuit arranged to receive a first voltage signal from the first terminal of the inductor, and to provide an integrated first voltage signal at an output of the first integration circuit;
    an input of a second integration circuit coupled to a second terminal of the inductor, the second integration circuit arranged to receive a second voltage signal from the second terminal of the inductor and to provide an integrated second voltage signal at an output of the second integration circuit; and
    a comparator with a first input coupled to the output of the first integration circuit and a second input coupled to the output of the second integration circuit, the comparator arranged to output the control signals at an output of the comparator and to provide the control signals to the controller.

8. The buck-boost switching converter of claim 7, is a hysteretic buck-boost switching converter, wherein the comparator exhibits hysteresis.

9. The buck-boost switching converter of claim 7, comprising a feedback voltage coupled to the first input of the comparator and a reference voltage coupled to the second input of the comparator.

10. The buck-boost switching converter of claim 7, wherein the controller comprises a demultiplexer, that is arranged to receive the control signals from the output of the comparator and to provide the control signals to the first set of switches in the buck mode and to provide the control signals to the second set of switches in the boost mode.

11. The buck-boost switching converter of claim 10, wherein the demultiplexer provides the control signals to the first set of switches when operating in a first demultiplexer state and provides the control signals to the second set of switches when operating in a second demultiplexer state, wherein the demultiplexer is arranged to selectively operate in the first demultiplexer state or the second demultiplexer state based on the length of the time period throughout the course of which both of the first power switch and the second power switch are in the similar state.

12. The buck-boost switching converter of claim 7, wherein the first integration circuit comprises a first resistor and a first capacitor and the second integration circuit comprises a second resistor and a second capacitor.

13. The buck-boost switching converter of claim 7, wherein the output of the first integration circuit is coupled to the first input of the comparator via a first transmission element and the output of the second integration circuit is coupled to the second input of the comparator via a second transmission element.

14. The buck-boost switching converter of claim 13, wherein the first and second transmission elements are capacitors.

15. The buck-boost switching converter of claim 2, wherein the controller comprises a decision circuit, wherein:
    when operating in the buck mode, the decision circuit is arranged to provide a first mode signal to switch the buck-boost switching converter to the boost mode if the time period during which both of the first power switch and the second power switch are in a similar state exceeds the first threshold; and
    when operating in the boost mode, the decision circuit is arranged to provide a second mode signal to switch the buck-boost switching converter to the buck mode if the time period during which both of the first power switch and the second power switch are in a similar state exceeds the second threshold.

16. The buck-boost switching converter of claim 15, wherein the decision circuit comprises:
    an AND gate comprising a first input coupled to the first power switch and a second input coupled to the second power switch;
    a timing circuit comprising an input coupled to an output of the AND gate; and
    a mode circuit comprising an input coupled to an output of the timing circuit; wherein
    the AND gate outputs a high signal when the first power switch and the second power switch are in the similar state; wherein
    when operating in the buck mode, if a high signal is received at the input of the timing circuit for the first threshold then the timing circuit outputs a signal to the mode circuit, and in response the mode circuit provides the first mode signal to switch the mode of operation of the switching converter from the buck mode to the boost mode; and
    when operating in the boost mode, if a high signal is received at the input of the timing circuit for the second threshold then the timing circuit outputs a signal to the mode circuit, and in response the mode circuit provides the second mode signal to switch the mode of operation of the switching converter from the boost mode to the buck mode.

17. A method of controlling the operation of a buck-boost switching converter of the type comprising a first set of switches comprising a first power switch and a first ground switch, and a second set of switches comprising a second power switch and a second ground switch, the method comprising:
    sending control signals to the first set of switches and the second set of switches;
    in a buck mode, operating the first set of switches to provide buck regulation whilst holding the second power switch in a closed state;
    in a boost mode, operating the second set of switches to provide boost regulation whilst holding the first power switch in a closed state;
    detecting when the first power switch and the second power switch are in a similar state; and
    selectively operating the switching converter in the buck mode or the boost mode based on a length of a time period throughout the course of which both of the first power switch and the second power switch are in a similar state.

18. The method of claim 17, comprising:
when operating in the buck mode, switching the buck-boost switching converter to the boost mode if the time period during which both of the first power switch and the second power switch are in a similar state exceeds a first threshold; and
when operating in the boost mode, switching buck-boost switching converter to the buck mode if the time period during which both of the first power switch and the second power switch are in a similar state exceeds a second threshold.

19. The method of claim 18, wherein the first and second thresholds are the same.

20. The method of claim 17, wherein the buck-boost switching converter comprises an energy storage element, wherein an output of the buck-boost switching converter is coupled with the energy storage element when the second power switch is in a closed state, and an input is coupled with the energy storage element when the first power switch is in a closed state.

21. The method of claim 17, wherein the similar state is a closed state.

22. The method of claim 20, wherein the energy storage element is an inductor.

23. The method of claim 22, comprising:
integrating a first voltage signal from a first terminal of the inductor and providing an integrated first voltage signal to a first input of a comparator;
integrating a second voltage signal from a second terminal of the inductor and providing an integrated second voltage to a second input of the comparator; and
outputting the control signals from an output of the comparator.

24. The method of claim 23, wherein the comparator exhibits hysteresis.

25. The method of claim 23, comprising providing a feedback voltage to the first input of the comparator and providing a reference voltage to the second input of the comparator.

26. A buck-boost switching converter with an input for receiving an input voltage and an output for providing an output voltage, comprising:
a first set of switches comprising a first power switch and a first ground switch;
a second set of switches comprising a second power switch and a second ground switch;
a comparator;
an energy storage element, the output is coupled with the energy storage element when the second power switch is in a closed state, and the input is coupled with the energy storage element when the first power switch is in a closed state;
an input of a first integration circuit coupled to a first terminal of the energy storage element, the first integration circuit arranged to receive a first voltage signal from the first terminal of the energy storage element and to provide an integrated first voltage signal at an output of the first integration circuit; and
an input of a second integration circuit coupled to a second terminal of the energy storage element, the second integration circuit arranged to receive a second voltage signal from the second terminal of the energy storage element and to provide an integrated second voltage signal at an output of the second integration circuit; wherein
the comparator has a first input coupled to the output of the first integration circuit, a second input coupled to the output of the second integration circuit, the comparator is arranged to output the control signals at an output of the comparator and to provide control signals to the first set of switches and the second set of switches and arranged such that:
in a buck mode, the first set of switches operates to provide buck regulation while the second power switch is held in a closed state; and
in a boost mode, the second set of switches operates to provide boost regulation while the first power switch is held in a closed state.

27. The buck-boost switching converter of claim 26, wherein the energy storage element is an inductor.

28. A method of controlling the operation of a buck-boost switching converter of the type comprising a first set of switches comprising a first power switch and a first ground switch, and a second set of switches comprising a second power switch and a second ground switch, the method comprising:
integrating a first voltage signal from a first terminal of an energy storage element, wherein the input is coupled with the energy storage element when the first power switch is in a closed state;
providing an integrated first voltage signal to a first input of a comparator;
integrating a second voltage signal from a second terminal of the energy storage element, wherein the output is coupled with the energy storage element when the second power switch is in a closed state;
providing an integrated second voltage signal to a second input of the comparator; and
receiving control signals at the first set of switches and the second set of switches, from an output of the comparator; wherein:
in a buck mode, the first set of switches operates to provide buck regulation while the second power switch is held in a closed state; and
in a boost mode, the second set of switches operates to provide boost regulation while the first power switch is held in a closed state.

29. The method of claim 28, wherein the energy storage element is an inductor.

* * * * *